(12) United States Patent
Manolakos et al.

(10) Patent No.: US 12,500,718 B2
(45) Date of Patent: Dec. 16, 2025

(54) POSITIONING SIGNAL PRIORITIZATION

(71) Applicant: QUALCOMM Incorporated, San Diego, CA (US)

(72) Inventors: Alexandros Manolakos, Escondido, CA (US); Yih-Hao Lin, San Diego, CA (US); Sony Akkarakaran, Poway, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 17/800,966

(22) PCT Filed: Mar. 16, 2021

(86) PCT No.: PCT/US2021/022556
§ 371 (c)(1),
(2) Date: Aug. 19, 2022

(87) PCT Pub. No.: WO2021/194801
PCT Pub. Date: Sep. 30, 2021

(65) Prior Publication Data
US 2023/0108914 A1 Apr. 6, 2023

(30) Foreign Application Priority Data
Mar. 24, 2020 (GR) ............... 20200100152

(51) Int. Cl.
*H04L 5/00* (2006.01)
*H04W 24/10* (2009.01)
(Continued)

(52) U.S. Cl.
CPC ......... *H04L 5/0051* (2013.01); *H04W 24/10* (2013.01); *H04W 72/1263* (2013.01); *H04W 72/566* (2023.01)

(58) Field of Classification Search
None
See application file for complete search history.

(56) References Cited

U.S. PATENT DOCUMENTS

2016/0066176 A1   3/2016  Zhang
2017/0280280 A1   9/2017  Jain et al.
(Continued)

FOREIGN PATENT DOCUMENTS

CN   107889230 A   4/2018
CN   109845172 A   6/2019
(Continued)

OTHER PUBLICATIONS

CATT: "Summary of 8.11.2 Enhancements for Commercial Use Cases", 3GPP Draft, 3GPP TSG RAN WG2 Meeting #112-e, R2-2010669, 3rd Generation Partnership Project (3GPP), Mobile Competence Centre, 650, Route Des Lucioles, F-06921 Sophia-Antipolis Cedex, France, vol. RAN WG2, No. Electronic Meeting, Nov. 2, 2020-Nov. 13, 2020, Oct. 27, 2020 (Oct. 27, 2020), XP051947950, 16 Pages.

(Continued)

*Primary Examiner* — Christine T Duong
(74) *Attorney, Agent, or Firm* — QUALCOMM Incorporated

(57) ABSTRACT

A UE includes a processor configured to determine whether to prioritize processing of a first reference signal relative to a priority reference that comprises a second reference signal and/or a priority reference channel. The first reference signal comprises a positioning reference signal. To determine whether to prioritize processing the processor is at least one of: configured to determine whether to measure, absent a measurement gap, the first reference signal (a first downlink reference signal) instead of the second reference signal; or configured to determine whether to measure, absent the measurement gap, the first downlink reference signal instead (Continued)

of a downlink channel; or configured to determine whether to transmit the first reference signal, comprising a first uplink reference signal, instead of a second uplink reference signal; or configured to determine whether to transmit the first uplink reference signal instead of transmitting on the priority reference channel.

29 Claims, 10 Drawing Sheets

(51) Int. Cl.
  *H04W 72/1263* (2023.01)
  *H04W 72/566* (2023.01)

(56) References Cited

U.S. PATENT DOCUMENTS

| | | | |
|---|---|---|---|
| 2020/0021409 | A1 | 1/2020 | Kumar et al. |
| 2020/0137601 | A1* | 4/2020 | Siomina ............... H04W 4/70 |
| 2022/0026517 | A1* | 1/2022 | Hasegawa ............. G01S 7/003 |
| 2022/0187411 | A1 | 6/2022 | Manolakos et al. |
| 2022/0191720 | A1 | 6/2022 | Cui et al. |
| 2023/0104211 | A1 | 4/2023 | Manolakos et al. |

FOREIGN PATENT DOCUMENTS

| | | |
|---|---|---|
| EP | 3573277 A1 | 11/2019 |
| WO | WO-2017172138 | 10/2017 |

OTHER PUBLICATIONS

InterDigital Inc: "Discussion on Potential Positioning Enhancements", 3GPP Draft, 3GPP TSG RAN WG1 #103-e, R1-2008491, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 16, 2020 (Oct. 16, 2020), XP051940175, 8 Pages.

CATT: "Discussion on RSTD Measurement Requirements", 3GPP RAN WG4 Meeting #94-e, R4-2000589, Online, Feb. 24-Mar. 6, 2020, 5 pages.

Ericsson: "Carrier Specific Scaling Factor for Gap-based Measurements with Multiple Measurement Objects", 3GPP TSG-RAN WG4 Meeting #88bis, R4-1812096, Chengdu, China, Oct. 8-12, 2018, pp. 1-7.

Ericsson: "Measurement in Gaps or Fully Overlapped with Gaps with Multiple Layers", 3GPP TSG-RAN WG4 Meeting #88, R4-1809737, 3GPP TSG-RAN WG4 Meeting #88, Gotheburg, Sweden, Aug. 20-24, 2018, pp. 1-4.

Huawei: "DL and UL Reference Signals for NR Positioning", 3GPP Draft; 3GPP TSG RAN WG1 Meeting #96bis, R1-1904004, 3rd Generation Partnership Project (3GPP), Mobile Competence Centre; 650, Route Des Lucioles; F-06921 Sophia-Antipolis Cedex; France, vol. RAN WG1, No. Xi'an, China; Apr. 8, 2019-Apr. 12, 2019, Apr. 2, 2019 (Apr. 2, 2019), XP051707080, 13 Pages, the whole document, Section 1, paragraph [02.3]—paragraph [02.4], p. 3.

Intel Corporation: "Downlink and Uplink Reference Signals for NR Positioning", 3GPP TSG RAN WG1 Meeting #96bis, R1-1904320, Xi'an, China, Apr. 8-12, 2019, pp. 1-15.

Intel Corporation: "On Radio-Layer Procedures for NR Positioning", 3GPP Draft, 3GPP TSG RAN WG1 Meeting #96bis, R1-1906824 (R1-1904322) Intel—NRPOS_Procedures, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, May 13, 2019 (May 13, 2019), Apr. 8-12, 2019, XP051728275, 11 Pages.

LG Electronics: "Discussions on DL only based Positioning", 3GPP TSG RAN WG1 #96, R1-1903346, Athens, Greece, Feb. 25-Mar. 1, 2019, 15 pages.

NEC Group: "Collision of PMCH and PRS Transmission in the Same MBSFN Subframe", 3GPP TSG-RAN WG1 #64, R1-110747, Collision of PMCH and PRS Transmission in the Same Subframe, 3rd Generation Partnership Project, Mobile Competence Centre, 650, Route Des Lucioles, F-06921, Sophia-Antipolis Cedex, France, vol. RAN WG1, No. Taipei, Taiwan, Feb. 21, 2011-Feb. 25, 2011, Feb. 15, 2011, XP050490549, 3 pages, Collision of PMCH and PRS Transmissions, p. 1, paragraph 2—p. 3.

Taiwan Search Report—TW110109625—TIPO—Sep. 2, 2024.

Mediatek: "Discussion on PRS RSTD Measurement", 3GPP Draft, 3GPP TSG RAN WG4 meeting #93, R4-1913264, 3rd Generation Partnership Project (3GPP), Mobile Competence Centre, 650, Route Des Lucioles, F-06921 Sophia-Antipolis Cedex, France, vol. RAN WG4, No. Reno, Nevada, USA, Nov. 18, 2019-Nov. 22, 2019, Nov. 8, 2019 (Nov. 8, 2019), XP051817886, 7 Pages, the whole document.

Panasonic, et al., "Way forward: Handling of the collision between PRS and EPDCCH", 3GPP TSG-RAN WG1 #72bis, R1-131781, Chicago, IL, USA, Apr. 15-20, 2013, Apr. 19, 2013, 1 page.

CATT: "Summary of 8.11.2 Enhancements for Commercial Use Cases", 3GPP Draft, 3GPP TSG RAN WG2 Meeting #112-e, R2-2010669, 3rd Generation Partnership Project (3GPP), Mobile Competence Centre, 650, Route Des Lucioles, F-06921 Sophia-Antipolis Cedex, France, vol. Ran WG2, No. Electronic Meeting, Nov. 2-13, 2020, Oct. 27, 2020 (Oct. 27, 2020), XP051947950, 16 Pages, Retrieved from the Internet: URL: https://ftp.3gpp.org/tsg_ran/WG2_RL2/TSGR2_112-e/Docs/R2-2010669.zip. R2-2010669 Summary of 8.11.2 Enhancements for Commercial use Cases.docx [Retrieved on Oct. 27, 2020] Paragraphs [001.], [002.], [02.1], [02.2].

Interdigital Inc: "Discussion on Potential Positioning Enhancements", 3GPP Draft, 3GPP TSG RAN WG1 #103-e, R1-2008491, 3rd Generation Partnership Project (3GPP), Mobile Competence Centre, 650, Route Des Lucioles, F-06921 Sophia-Antipolis Cedex, France, vol. Ran WG1, No. e-Meeting, 20201026 - 20201113, Oct. 16, 2020 (Oct. 16, 2020), XP051940175, 8 Pages, Retrieved from the Internet: URL: https://ftp.3gpp.org/tsg_ran/WG1_RL1/TSGR1_103-e/Docs/R1-2008491.zip, R1-2008491_103e POS_853_ENH_SUBMIT.docx [Retrieved on Oct. 16, 2020] —paragraphs [02 .1] , [02. 2] , [2. 2 .1] , [0003], Sections II.B and II.C.

International Search Report and Written Opinion—PCT/US2021/022556—ISA/EPO—Aug. 16, 2021.

\* cited by examiner

700

| 711 | 712 | 713 | 714 | 715 | 716 | 717 | 718 | 719 |
|---|---|---|---|---|---|---|---|---|
| DMRS for PDSCH | DMRS for PDCCH | DMRS for PBCH | PTRS for PDSCH | CSIRS | RIM RS | PDSCH | PDCCH | PBCH |
| 1 | 0 | 0 | 0 | 1 | 0 | 0 | 0 | 1 |

750

| 751 | 752 | 753 | 754 |
|---|---|---|---|
| Legacy SRS | SRS for communication | PUSCH | PUCCH |
| 1 | 0 | 0 | 0 |

POSITIONING SIGNAL PRIORITIZATION

CROSS-REFERENCE TO RELATED APPLICATIONS

This application is the National Stage of International Application No. PCT/US2021/022556, filed Mar. 16, 2021, entitled "POSITIONING SIGNAL PRIORITIZATION," which claims the benefit of Greek patent application No. 20200100152, filed Mar. 24, 2020, entitled "POSITIONING SIGNAL PRIORITIZATION," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example user equipment (UE) includes: a transceiver comprising a receiver configured to receive inbound communication signals wirelessly from a network entity and a transmitter configured to transmit outbound communication signals wirelessly to the network entity; a memory; and a processor communicatively coupled to the memory and the transceiver, the processor being configured to determine whether to prioritize processing of a first reference signal relative to a priority reference, wherein the priority reference comprises a second reference signal, or a priority reference channel, or a combination thereof, wherein the first reference signal comprises a positioning reference signal, and wherein in order to determine whether to prioritize processing of the first reference signal relative to the priority reference the processor is at least one of: configured to determine whether to measure, absent a measurement gap, the first reference signal instead of the second reference signal, the first reference signal comprising a first downlink reference signal and the second reference signal comprising a second downlink reference signal that is different from the first downlink reference signal; or configured to determine whether to measure, absent the measurement gap, the first downlink reference signal instead of the priority reference channel, wherein the priority reference channel comprises a downlink channel; or configured to determine whether to transmit the first reference signal, comprising a first uplink reference signal, instead of the second reference signal, comprising a second uplink reference signal that is different from the first uplink reference signal; or configured to determine whether to transmit the first uplink reference signal instead of transmitting on the priority reference channel, wherein the priority reference channel comprises an uplink channel.

DETAILED DESCRIPTION

Figure 1:
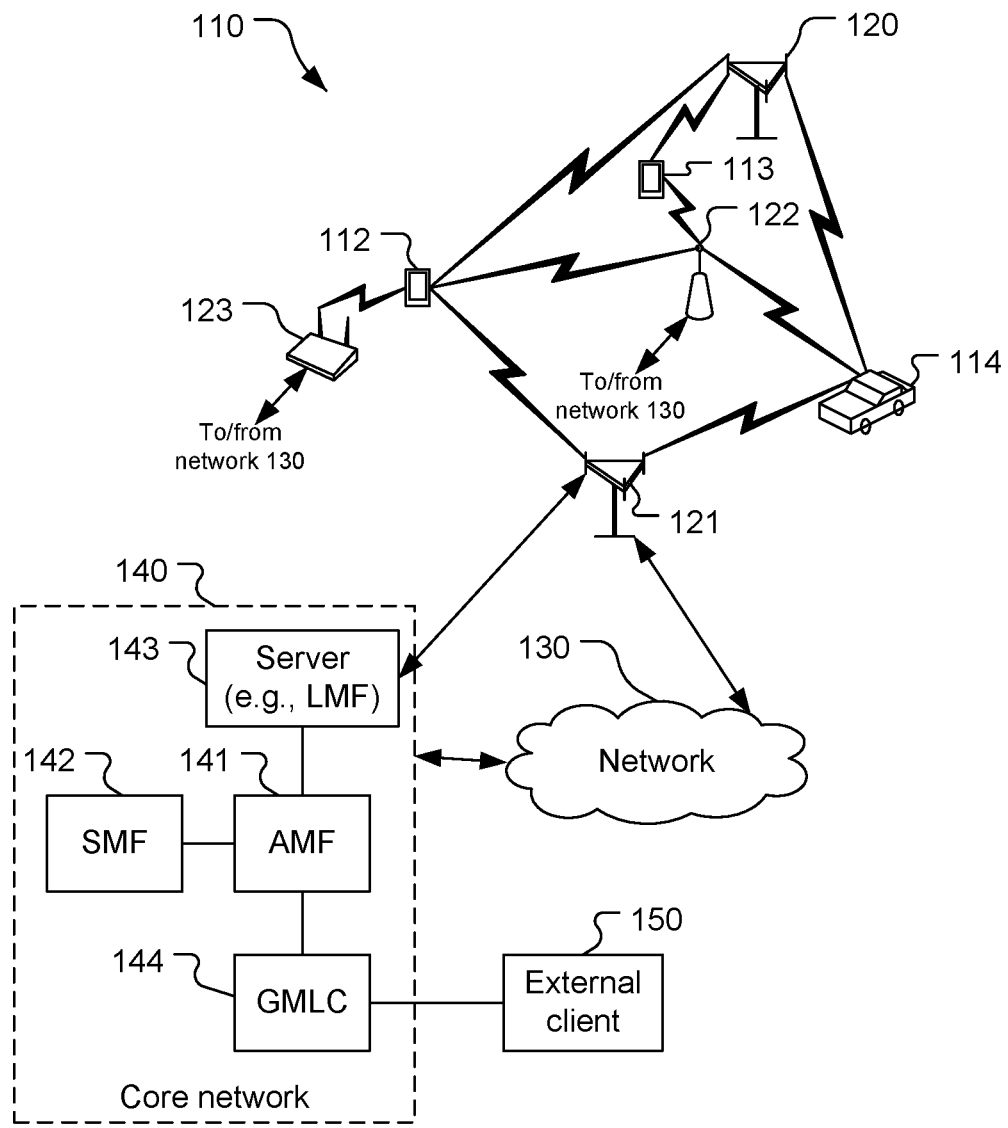
FIG. 1 is a simplified diagram of an example wireless communications system.

Techniques are discussed herein for prioritizing positioning reference signals. One or more factors may be considered to determine whether to give higher priority to positioning reference signals, downlink and/or uplink, relative to other signals or channels. For example, explicit and/or implicit indications of priority may be analyzed. A positioning procedure (technique) to be implemented using positioning reference signals may influence priority of processing of positioning reference signals. A structure of positioning reference signals (e.g., quantities of symbols per slot, a repetition quantity, or a gap between consecutive repetitions) may influence priority of processing (e.g., measuring) of positioning reference signals. Priority of a positioning signal over a channel may be given for a search window for searching for the positioning signal. When a positioning signal has priority and collides with a symbol of another reference signal or channel information, then the non-colliding portion of the other signal or channel may be processed (e.g., measured), or none of the other signal or channel information may be processed. These are examples, and other examples may be implemented.

Items and/or techniques described herein may provide one or more of the following capabilities, as well as other capabilities not mentioned. Reliability of location determination may be improved. Processing of positioning reference signals may preempt processing of conflicting information as appropriate. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example wireless communications system 110 includes a user equipment (UE) 112, a UE 113, a UE 114, base transceiver stations (BTSs) 120, 121, 122, 123, a network 130, a core network 140, and an external client 150. The core network 140 (e.g., a 5G core network (5GC)) may include back-end devices including, among other things, an Access and Mobility Management Function (AMF) 141, a Session Management Function (SMF) 142, a server 143, and a Gateway Mobile Location Center (GMLC) 144. The AMF 141, the SMF 142, the server 143, and the GMLC 144 are communicatively coupled to each other. The server 143 may be, for example, a Location Management Function (LMF) that supports positioning of the UEs 112-114 (e.g., using techniques such as Assisted Global Navigation Satellite System (A-GNSS), OTDOA (Observed Time Difference of Arrival, e.g., Downlink (DL) OTDOA and/or Uplink (UL) OTDOA), Round Trip Time (RTT), Multi-Cell RTT, RTK (Real Time Kinematic), PPP (Precise Point Positioning), DGNSS (Differential GNSS), E-CID (Enhanced Cell ID), AoA (Angle of Arrival), AoD (Angle of Departure), etc.).

An LMF may also be referred to as a Location Manager (LM), a Location Function (LF), a commercial LMF (CLMF), or a value-added LMF (VLMF). The server 143 (e.g., an LMF) and/or one or more other devices of the system 110 (e.g., one or more of the UEs 112-114) may be configured to determine locations of the UEs 112-114. The server 143 may communicate directly with the BTS 121 (e.g., a gNB) and/or one or more other BTSs, and may be integrated with the BTS 121 and/or one or more other BTSs. The SMF 142 may serve as an initial contact point of a Service Control Function (SCF) (not shown) to create, control, and delete media sessions. The server 143 (e.g., an LMF) may be co-located or integrated with a gNB or a TRP (Transmission/Reception Point), or may be disposed remote from the gNB and/or TRP and configured to communicate directly or indirectly with the gNB and/or the TRP. The server 143 (e.g., an LMF) may be a part of the core network 140 as shown, or may be independent of (not part of) the core network 140.

The AMF 141 may serve as a control node that processes signaling between the UEs 112-114 and the core network 140, and provides QoS (Quality of Service) flow and session management. The AMF 141 may support mobility of the UEs 112-114 including cell change and handover and may participate in supporting signaling connection to the UEs 112-114.

The system 110 is capable of wireless communication in that components of the system 110 can communicate with one another (at least some times using wireless connections) directly or indirectly, e.g., via the BTSs 120-123 and/or the network 130 (and/or one or more other devices not shown, such as one or more other base transceiver stations). For indirect communications, the communications may be altered during transmission from one entity to another, e.g., to alter header information of data packets, to change format, etc. The UEs 112-114 shown are a smartphone, a tablet computer, and a vehicle-based device, but these are examples only as the UEs 112-114 are not required to be any of these configurations, and other configurations of UEs may be used. The UEs 112, 113 shown are mobile wireless communication devices (although they may communicate wirelessly and via wired connections) including mobile phones (including smartphones) and a tablet computer. The UE 114 shown is a vehicle-based mobile wireless communication device (although the UE 114 may communicate wirelessly and via wired connections). Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 110 and may communicate with each other and/or with the UEs 112-114, the BTSs 120-123, the network 130, the core network 140, and/or the external client 150. For example, such other devices may include internet of thing (IoT) devices, medical devices, home entertainment and/or automation devices, etc. The core network 140 may communicate with the external client 150 (e.g., a computer system), e.g., to allow the external client 150 to request and/or receive location information regarding the UEs 112-114 (e.g., via the GMLC 144).

The UEs 112-114 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 110 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 120-123 may wirelessly communicate with the UEs 112-114 in the system 110 via one or more antennas. A BTS may also be referred to as a base station, an access point, a gNode B (gNB), an access node (AN), a Node B, an evolved Node B (eNB), etc. For example, each of the BTSs 120, 121 may be a gNB or a transmission point gNB, the BTS 122 may be a macro cell (e.g., a high-power cellular base station) and/or a small cell (e.g., a low-power cellular base station), and the BTS 123 may be an access point (e.g., a short-range base station configured to communicate with short-range technology such as WiFi, WiFi-Direct (WiFi-D), Bluetooth®, Bluetooth®-low energy (BLE), Zigbee, etc. One or more of the BTSs 120-123 may be configured to communicate with the UEs 112-114 via multiple carriers. Each of the BTSs 120, 121 may provide communication coverage for a respective geographic region, e.g. a cell. Each cell may be partitioned into multiple sectors as a function of the base station antennas.

The BTSs 120-123 each comprise one or more Transmission/Reception Points (TRPs). For example, each sector within a cell of a BTS may comprise a TRP, although multiple TRPs may share one or more components (e.g., share a processor but have separate antennas). The system 110 may include only macro TRPs or the system 110 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

The UEs 112-114 may be referred to as terminals, access terminals (ATs), mobile stations, mobile devices, subscriber units, etc. The UEs 112-114 may include various devices as listed above and/or other devices. The UEs 112-114 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of the UEs 112-114 utilizing D2D communications may be within a geographic coverage area of a TRP such as one or more of the BTSs 120-123. Other UEs in such a group may be outside such geographic coverage areas, or be otherwise unable to receive transmissions from a base station. Groups of the UEs 112-114 communicating via D2D communications may utilize a one-to-many (1:M) system in which each UE may transmit to other UEs in the group. A TRP of the BTSs 120-123 may facilitate scheduling of resources for D2D communications. In other cases, D2D communications may be carried out between UEs without the involvement of a TRP.

Figure 2:
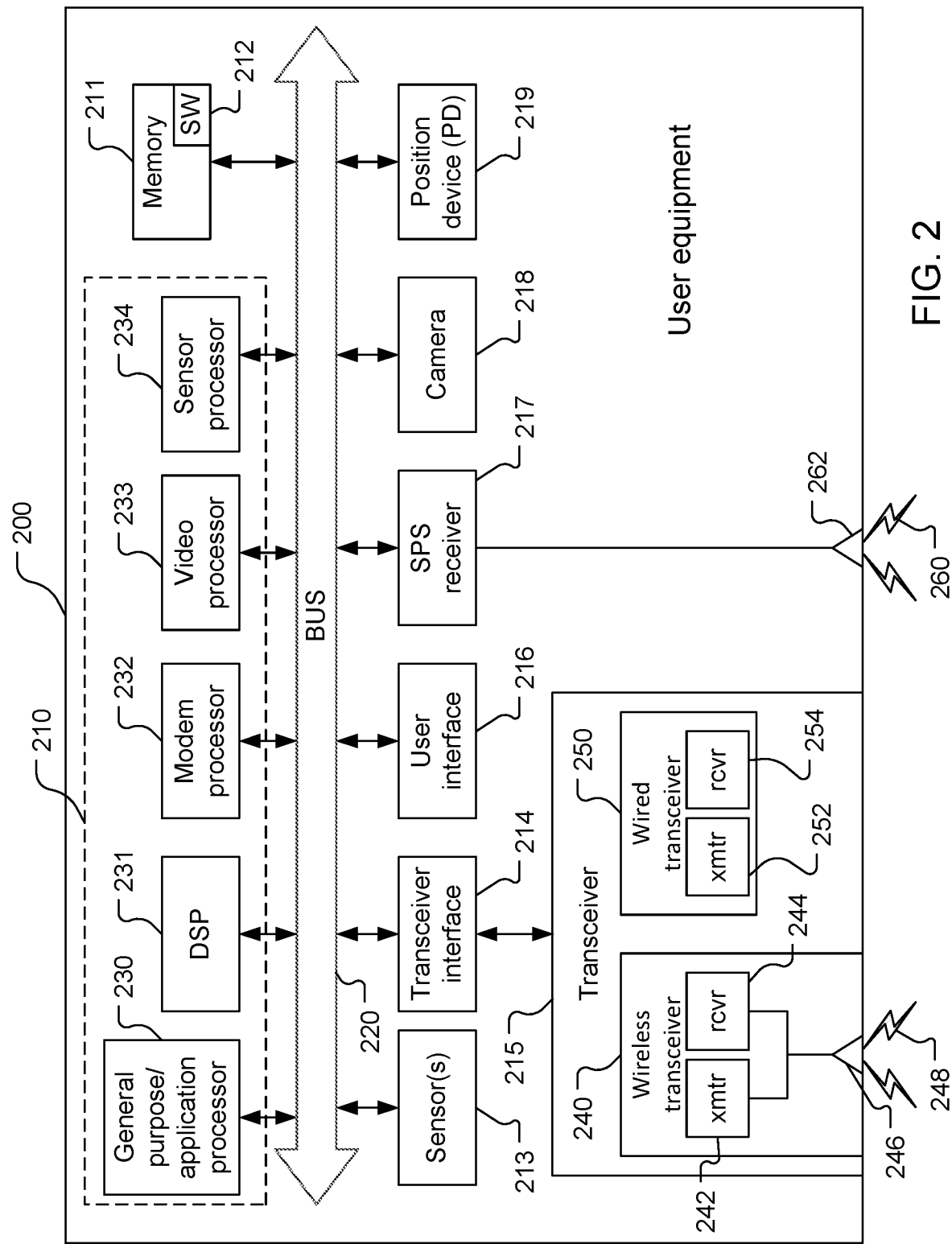
FIG. 2 is a block diagram of components of an example user equipment shown in FIG. 1.

Referring also to FIG. 2, a UE 200 is an example of one of the UEs 112-114 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more cellular wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the server 143 regarding the mobility of the UE 200. For example, based on the information obtained/measured by the sensor(s) 213, the UE 200 may notify/report to the server 143 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 130 to send communications to, and receive communications from, the network 130. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
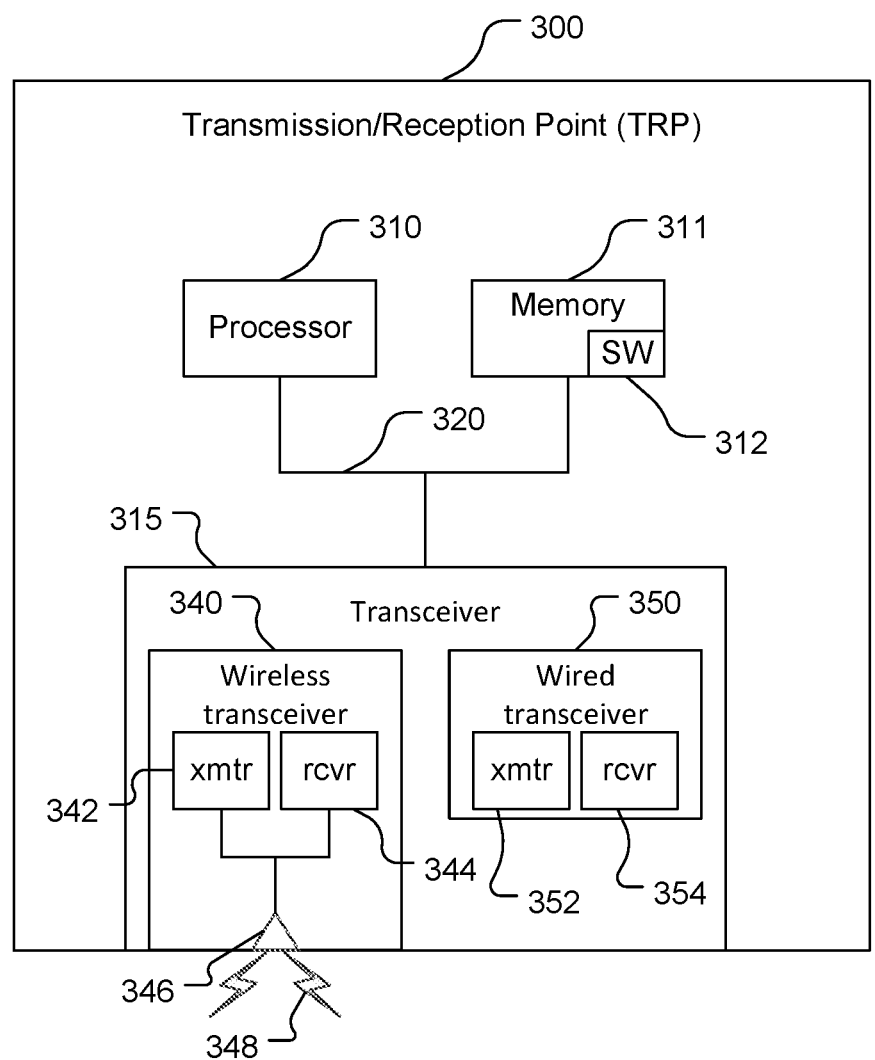
FIG. 3 is a block diagram of components of an example transmission/reception point shown in FIG. 1.

Referring also to FIG. 3, an example of a TRP 300 of the BTSs 120-123 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BTSs 120-123) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 130 to send communications to, and receive communications from, the server 143, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the server 143 and/or the UE 200 (i.e., the server 143 and/or the UE 200 may be configured to perform one or more of these functions).

Figure 4:
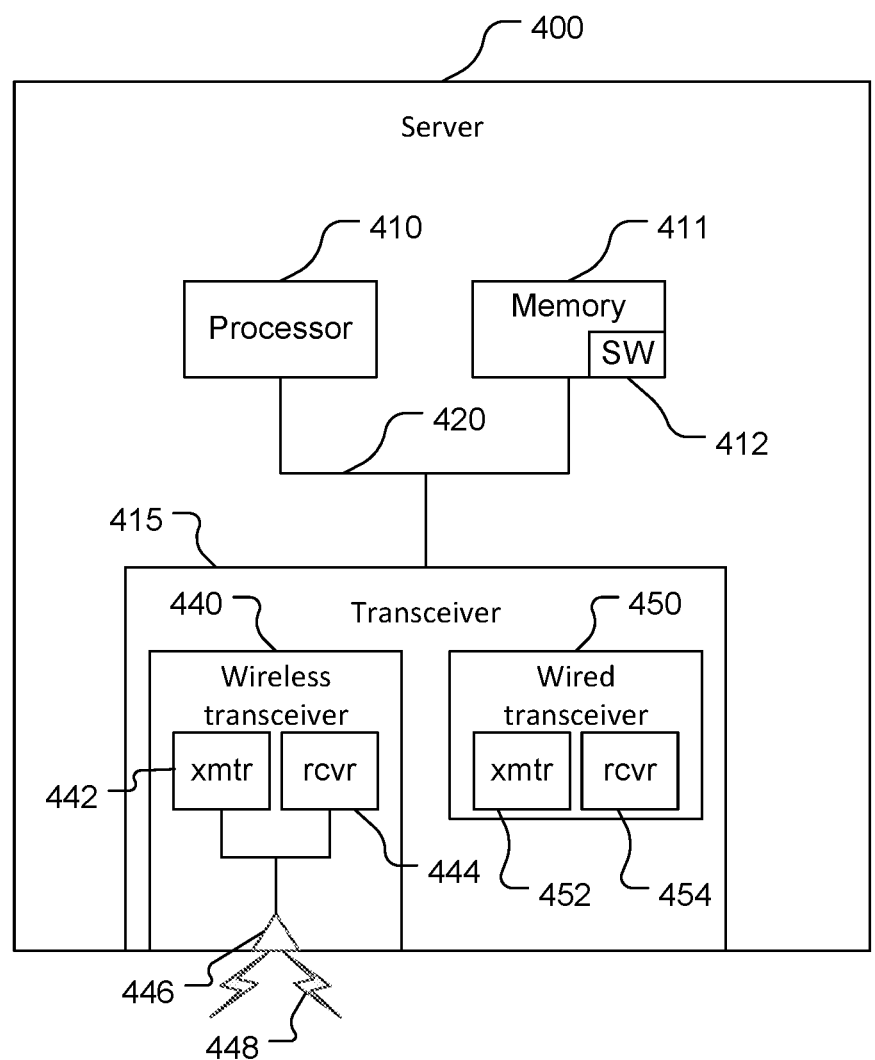
FIG. 4 is a block diagram of components of an example server shown in FIG. 1.

Referring also to FIG. 4, a server 400, which is an example of the server 143, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 130 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of an LMF. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 112-114. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as an LMF). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Prioritization of Positioning Reference Signals

Historically in LTE and NR, a UE does not process DL PRS that collides with another DL signal or channel transmitted to the UE absent a measurement gap (with a measurement gap being a time when the UE is to receive and measure PRS and not other signals or channels). Each channel is a logical connection between entities such as a TRP and a UE. The term "channel" may also refer herein to information conveyed over a channel. The discussion herein provides techniques for prioritizing PRS processing over other DL signals and channels even absent a measurement gap such that PRS that collide (e.g., is expected to collide or actually collides) with another signal or channel may be processed.

Figure 5:
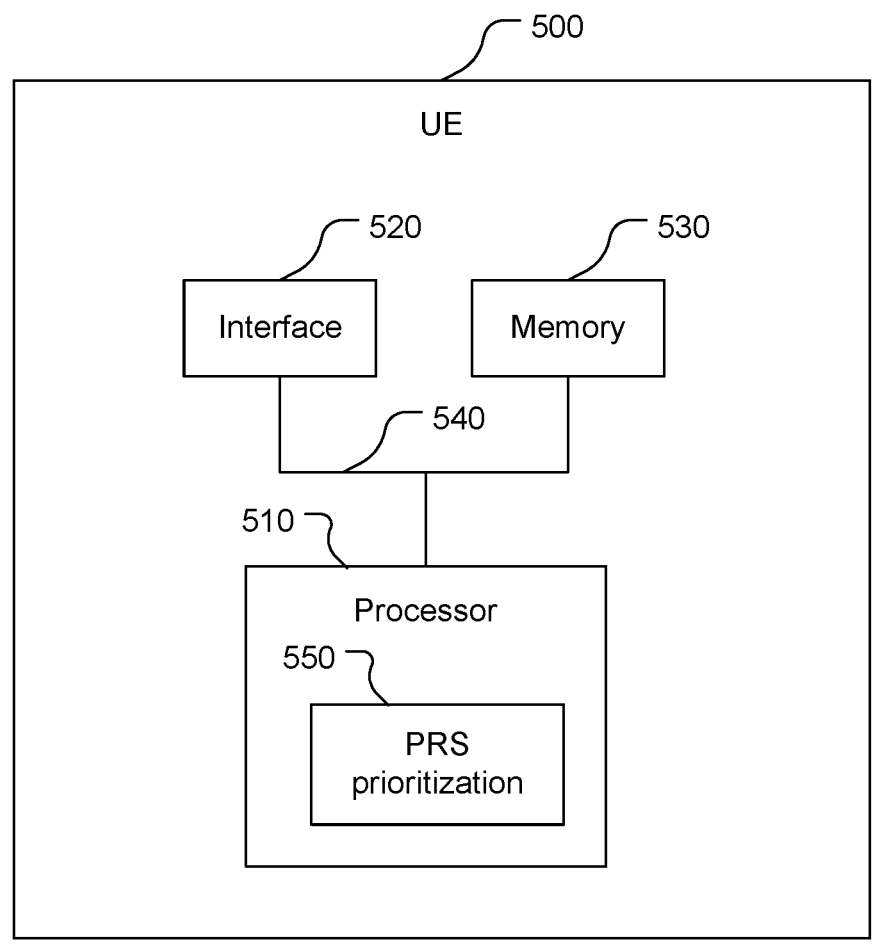
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include the components shown in FIG. 5, and may include one or more other components such as any of those shown in FIG. 2 such that the UE 200 may be an example of the UE 500. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. The memory 530 may be configured similarly to the memory 211, e.g., including software with processor-readable instructions configured to cause the processor 510 to perform functions. The description may refer only to the processor 510 performing a function, but this includes other implementations such as where the processor 510 executes software (stored in the memory 530) and/or firmware. The description may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a PRS prioritization unit 550 configured to determine and implement prioritization of PRS as discussed herein. The PRS prioritization unit 550 is discussed further below, and the description may refer to the processor 510 generally, or the UE 500 generally, as performing any of the functions of the PRS prioritization unit 550. Operation of the PRS prioritization unit 550 is discussed herein with reference to FIG. 6 that shows a signaling and process flow 600 for determining and implementing prioritization of PRS. The flow 600 includes the stages shown but is an example only, as stages may be added, rearranged, and/or removed.

The PRS prioritization unit 550 is configured to determine whether PRS (DL PRS or UL PRS (also known as SRS for positioning)) will have higher priority than another reference signal and/or another channel (i.e., other than the channel on which the PRS are conveyed). The PRS prioritization unit 550 may determine whether the PRS will have higher priority based on one or more factors, and may determine whether the PRS will have higher priority over a combination of other reference signals, a combination of other channels, or a combination of one or more other reference signals and one or more other channels. Examples of other reference signals are DMRS (demodulation RS) for PDSCH (Physical Downlink Shared Channel), DMRS for PDCCH (Physical Downlink Control Channel), DMRS for PBCH (Physical Broadcast Channel), PTRS (Phase-Tracking RS) for PDSCH, CSI-RS (Channel State Information-Reference Signal), and RIM (Radio Access Network (RAN) Information Management) RS. Examples of channels include PDSCH, PDCCH, and PBCH. The PRS prioritization unit 550 may determine priority of the PRS associated with a PRS resource, a PRS resource set, a frequency layer, and/or a TRP.

The UE 500 is configured to provide processing priority based on the priority indicated by the prioritization unit 550. If PRS has higher processing priority (also referred to herein as having higher priority), then the UE 500 will process (e.g., measure and possibly report) the PRS instead of the corresponding reference signal(s) and/or channel(s) of lower priority that collide with the PRS outside of a measurement gap. Lower-priority reference signal(s) or channel(s) that collide with higher-priority PRS will not be processed, e.g., may be discarded or ignored by the processor 510, or not provided to the processor 510. Similarly, lower-priority PRS that collide with higher-priority reference signal(s) or channel(s) will not be processed, e.g., may be discarded or ignored by the processor 510, or not provided to the processor 510. The processor 510 may include a portion of the interface 520, e.g., to the extent that the interface 520 makes a decision regarding whether to process or forward information for further processing. Thus, the processor 510 is a logical designation and not necessarily a physical designation, and the processor 510 includes components for processing regardless of physical locations within the UE 500.

The UE 500 may provide higher priority on a PRS resource level. For example, a beam, corresponding to a resource, in a resource set of multiple resources may be more important for PRS than data and thus the UE 500 may give higher priority to PRS than to data for that beam. The UE 500 may provide different priorities for different PRS resources within a PRS resource set.

The UE 500 may provide higher priority on a PRS resource set level. For example, if a resource set has a low periodicity (such that the resource set occurs infrequently), then any collision may be more significant than for a resource set of higher periodicity, and thus the UE 500 may provide higher priority to a low-periodicity resource set to help ensure that the resource set is processed. Alternatively, a high-periodicity resource set may have a high periodicity because the content of the resource set is important and should be processed often, and thus the UE 500 may provide a high-periodicity resource set with a high priority (e.g., higher priority than data). The UE 500 may provide some resource sets in a frequency layer with higher priority than data and some resource sets in the frequency layer with lower priority than data.

The UE 500 may provide higher priority based on frequency layer, e.g., to provide priority to a frequency layer corresponding to a frequency range. For example, a first frequency layer (FL1) may correspond to FR1 (Frequency Range 1 from 410 MHz to 7.125 GHz) and a second frequency layer (FL2) may correspond to FR2 (Frequency Range 2 that is a mm-wave band from 24.25 GHz to 52.6 GHz). The second frequency layer FL2 may be opportunistic, with less data and thus lower likelihood of collision, and thus the UE 500 may give the second frequency layer lower priority, and the first frequency layer higher priority, due to the lower likelihood of collisions in FL2. As another example, one FL may be configured for data and another FL configured for PRS, e.g., one FL has a higher priority for data than for PRS and the other FL has a higher priority for PRS than for data.

The UE 500 may provide priority to a particular TRP, for example, for use in RSTD positioning. The UE 500 may provide higher priority to PRS (e.g., than for another signal (e.g., reference signal, data signal) and/or for another channel) for the reference TRP to help ensure that the reference signal for the reference TRP is received in order to help ensure that the reference signal, the timing of which other signal timings are to be compared to determine time differences, is received and processed. Otherwise, time differences may be determined incorrectly or may even be impossible to determine.

Figure 6:
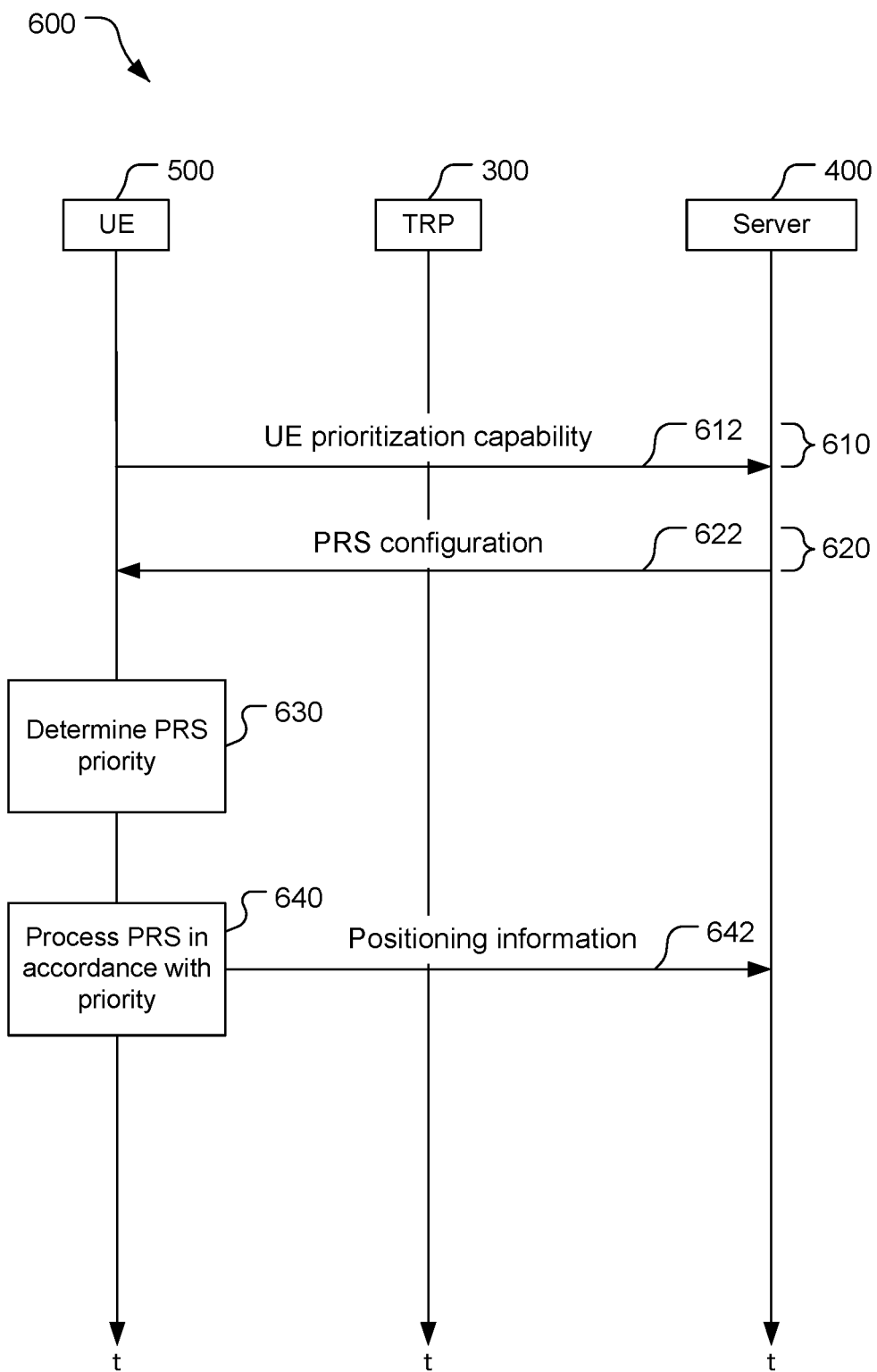
FIG. 6 is a signaling and process flow of positioning reference signal prioritizing.

The prioritization unit 550 may be configured to determine priority (e.g., of resource, resource set, frequency layer, TRP) in any of a variety of ways, e.g., based on one or more of a variety of factors. For example, the prioritization unit 550 may be configured to determine whether to prioritize processing of position reference signal based on an explicit or implicit indication, based on a timing behavior of PRS (DL-PRS and/or UL-PRS), based on a positioning technique to be implemented, and/or based on structure of the PRS. The UE 500 may provide prioritization capabilities of the UE 500 to the server 400 in a UE prioritization capability message 612 in stage 610 of the flow 600. The UE 500 may provide the message 612 to the server 400 either directly as shown in FIG. 6 or indirectly via one or more intermediaries such as the TRP 300. The message 612 may indicate the capability(ies) of the UE 500 to support prioritization of PRS processing. The capability(ies) may be reported in a band-specific or FR-specific manner, e.g., respective capability(ies) for respective bands/frequency ranges. The UE prioritization capability message 612 may be provided before and/or after stage 620 discussed below, and may be provided multiple times, e.g., intermittently (e.g., periodically, semi-persistently, or on demand).

One or more factors on which the UE 500 may determine PRS prioritization may be indicated by PRS configuration information received by the UE 500. For example, at stage 620 of the flow 600, the server 400 sends a PRS configuration message 622 to the UE 500. While the description herein refers to PRS, this term includes various forms of positioning signals, and thus the PRS configuration message 622 provides a positioning signal configuration. The PRS configuration message 622 may be sent directly from the server 400 to the UE 500 or via one or more intermediaries, such as the TRP 300. The PRS configuration message 622 may include, for example, scheduled timing of periodic PRS, periodicity, slot offset, bandwidth offset, number of ports, repetition factor, number of PRS symbols within a slot, information element type, one or more explicit priority indications, search window information (e.g., duration, start time, end time), and/or whether to expect aperiodic PRS and/or aperiodic PRS measurement report requests. For example, the UE 500 may give PRS resources configured with a particular type of IE (e.g., a 3GPP Release 17 type IE) higher processing priority than other channels with symbols colliding with the PRS. At stage 630, the UE 500 may determine priority of PRS relative to one or more other reference signals and/or one or more channels as discussed herein, particularly below. At stage 640, the UE 500 may process PRS according to the determined priority, e.g., making measurements, determining positioning information (e.g., one or more ranges, a location, etc.), producing and/or transmitting SRS for positioning, etc., and providing positioning information 642 as appropriate to the server 400, directly or indirectly.

The PRS prioritization unit 550 may be configured to determine priority of PRS processing based on one or more explicit indications of priority, e.g., contained in the PRS configuration message 622 received by the UE 500. For example, the PRS configuration message 622 may provide an indication, e.g., a single field or single bit, that PRS is to receive higher priority over one or more other references signals and/or one or more channels. For example, the PRS configuration message 622 may include a high/low priority bit that indicates whether the UE 500 is to give corresponding PRS high or low priority relative to one or more indicated other reference signals and/or one or more channels. The single bit may be known (e.g., programmed into the UE 500 in accordance with an industry standard) to apply to one or more other reference signals and/or one or more channels. The meaning of the single bit may be fixed or may be dynamically configurable by control signaling, e.g., by MAC-CE (Media Access Control-Control Element) or DCI (Downlink Control Information) signaling, or by higher-layer signaling such as LPP (LTE Positioning Protocol) or RRC (Radio Resource Control) signaling. Updates to the meaning of the single bit may be given by MAC-CE signaling, which is faster than LPP or RRC signaling. As two examples of dynamic meanings of the single bit, signaling may be received by the UE 500 to cause the meaning of a value of 1 of the single bit to be that PDSCH has a higher processing priority than PRS, or that PRS has a higher processing priority than PDSCH and PDCCH. For example, control signaling may be received to instruct the UE 500 as to the meaning of the single bit, e.g., effective upon receipt of the control signaling and until further notice or for a specified time or until a specified future time, and control signaling may later be received that changes the meaning of the single bit.

Figures 7A, 7B, 8:
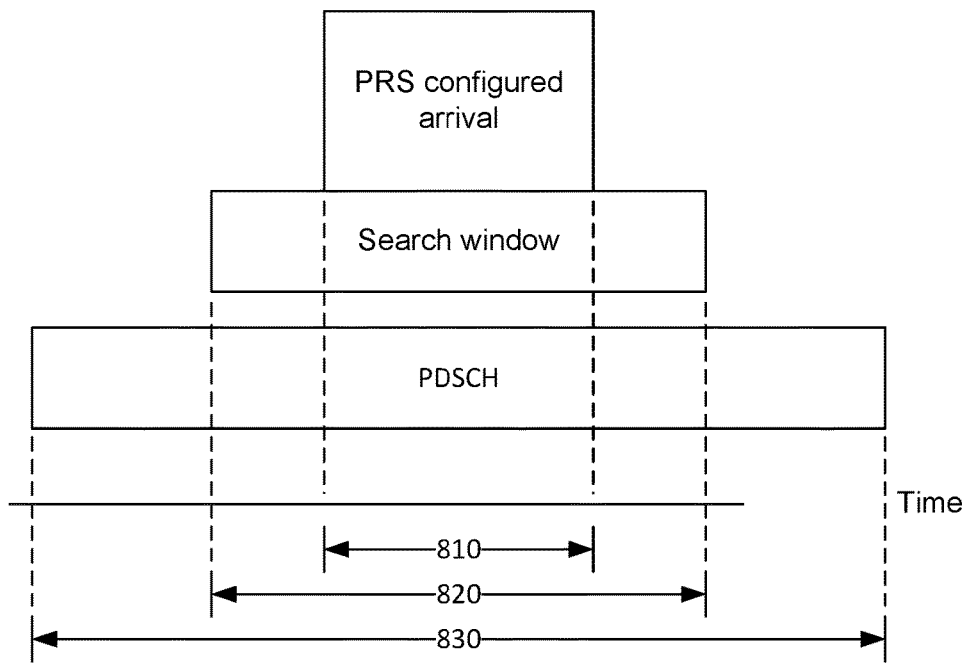
FIG. 7A is a simplified diagram of a control message with processing priority indications.
FIG. 7B is a simplified diagram of another control message with processing priority indications.
FIG. 8 is a timing diagram of a positioning reference signal, a search window for the positioning reference signal, and other signaling.

The explicit indications of priority may comprise multiple indications of priority each corresponding to a respective reference signal, or channel, or combination of reference signals, or combination of channels, or combination of one or more reference signals and one or more channels. For example, as shown in FIG. 7A, a control signal 700 includes nine fields, a DMRS for PDSCH field 711, a DMRS for PDCCH field 712, a DMRS for PBCH field 713, a PTRS for PDSCH field 714, a CSI-RS field 715, a RIM RS field 716, a PDSCH field 717, a PDCCH field 718, and a PBCH field 719. The control signal 700 is an example only and not limiting of the disclosure, including the claims. A bit in each of the fields 711-719 indicates whether DL PRS has higher priority processing than a corresponding reference signal and channel, or corresponding channel Here, a value of 1 indicates that DL PRS has higher processing priority than the corresponding reference signal and/or channel and a value of 0 indicates that DL PRS has lower processing priority than the corresponding reference signal and/or channel. An indication of higher priority for a channel, e.g., PBCH as indicated in the field 719, may override an indication of a signal on the channel, e.g., DMRS for PBCH in the field 713. Thus, even though the value of the DMRS for PBCH field 713 is 0 in this example, indicating that PRS has lower priority than DMRS for PBCH, because the value of the PBCH field 719 is 1, PRS has priority over all PBCH signaling and thus PRS will be processed by the UE 500, in this example, instead of DMRS for PBCH where PRS and DMRS for PBCH collide. In the example control signal 700 shown, all of the fields 711-719 correspond to a single reference signal and channel, or a single channel, but combinations of reference signals, channels, or one or more reference signals and one or more channels may be implemented.

Multiple explicit indications may be provided to indicate processing priority of SRS for positioning, e.g., relative to one or more other reference signals and/or one or more channels. For example, as shown in FIG. 7B, a control signal 750 includes four fields, a legacy SRS field 751, an SRS for communication field 752, a PUSCH (Physical Uplink Shared Channel) field 753, and a PUCCH (Physical Uplink Control Channel) field 754. The control signal 750 is an example only and not limiting of the disclosure, including the claims. A bit in each of the fields 751-754 indicates whether SRS for positioning has higher priority processing than the corresponding reference signal or channel Here, a value of 1 indicates that SRS for positioning has higher processing priority than the corresponding reference signal or channel and a value of 0 indicates that SRS for positioning has lower processing priority than the corresponding reference signal or channel In the example control signal 750 shown, all of the fields 751-754 correspond to a single reference signal or a single channel, but combinations of reference signals, channels, or one or more reference signals and one or more channels may be implemented.

The UE 500 may determine processing priority for SRS for positioning based on one or more explicit indications, e.g., in the PRS configuration message 622. Processing priority for SRS for positioning includes priority for producing and/or transmitting the SRS for positioning to the TRP 300. For example, prioritizing transmitting SRS for positioning may comprise producing SRS for positioning and legacy SRS and/or SRS for communication, and only sending the SRS for positioning, or producing only the SRS for positioning and transmitting the SRS for positioning. The message 622 may include one or more explicit indications that one or more SRS resources for positioning and/or one or more SRS resource sets for positioning are to have higher (or lower) processing priority than legacy SRS or SRS for communication. Legacy SRS is SRS for positioning, but of a different definition (e.g., defined previously, i.e., before present SRS for positioning) and given lower priority than (present) SRS for positioning. SRS for communication is SRS configured for one or more of various communication purposes, e.g., beam management, UL codebook-based communication, UL non-codebook-based communication, antenna switching/DL CSI acquisition.

The prioritization unit 550 may be configured to determine priority of PRS processing based on one or more implicit indications of priority, e.g., contained in the PRS configuration message 622 received by the UE 500. For example, the UE 500 may be configured to analyze one or more pieces of information from the PRS configuration message 622 in accordance with one or more rules, e.g., according to an industry standard, to determine PRS processing priority. The UE 500 may be configured to find one or more pieces of information from the PRS configuration message 622 in a look-up table of configuration information and PRS priority to determine the PRS priority. The UE 500 may, for example, be configured to use an indication of the information element type in the PRS configuration message 622 to determine a processing priority for PRS. The UE 500 may be configured to determine that PRS resources configured with information elements of a particular version (e.g., release) of an industry standard are to have processing priority, e.g., over other channels (i.e., channels not carrying the PRS resources) that collide with the PRS resources of the particular version of the industry standard. Implicit indications of PRS priority may or may not be configurable, e.g., being permanently programmed into the UE 500 based on the industry standard when the UE 500 is manufactured.

The prioritization unit 550 may be configured to determine priority of PRS processing based on timing behavior of the PRS. For example, the DL PRS may be sent by the TRP 300, and/or UL PRS may be sent by the UE 500, aperiodically (e.g., on demand), semi-persistently, or periodically and such time behavior may be indicated in the PRS configuration message 622. The UE 500 may be configured to give DL PRS higher processing priority (e.g., than data, CSI-RS, or control signaling) in response to transmission of the DL PRS being aperiodic, i.e., the DL PRS being configured as aperiodic DL PRS. The UE 500 may be configured to give DL PRS lower priority than data, CSI-RS, or control signaling where transmission of the DL PRS is semi-persistent or periodic (i.e., to give the data, CSI-RS, and control signaling higher priority where transmission of the DL PRS is semi-persistent or periodic). Similarly, the UE 500 may be configured to give higher priority to UL PRS sent aperiodically than to data and/or another type of signaling, and to give lower priority to UL PRS sent semi-persistently or periodically than to data and/or another type of signaling. The timing behaviors may be related to the positioning techniques to be implemented by the UE 500 using the PRS.

The prioritization unit 550 may be configured to determine priority of PRS processing based on a positioning method to be used. For example, the UE 500 may be configured to determine PRS processing priority based on what positioning method is to be used to process DL PRS and/or to produce and/or transmit SRS for positioning (e.g., a present positioning session type and thus in what type of positioning method the measurement of PRS and/or SRS for positioning is to be used). The UE 500 may be configured to determine PRS processing priority based on whether SRS for positioning is configured. The UE 500 may be configured to prioritize PRS over other reference signals and/or channels in response to SRS for positioning being configured, and thus to be produced and sent as part of a selected positioning method. The UE 500 may be configured such that for multi-RTT, whether the UE 500 gives higher priority to PRS depends on whether the SRS for positioning has higher priority than legacy SRS with the SRS for positioning and the legacy SRS having the same time domain behavior. Thus, the UE 500 may be configured to give the DL PRS higher (lower) processing priority in response to the SRS for positioning having higher (lower) priority (for processing and transmission) than legacy SRS, with the SRS for positioning and the legacy SRS having the same time domain behavior (e.g., aperiodic, semi-persistent, or periodic).

The prioritization unit 550 may be configured to determine priority of PRS processing based on a structure of DL PRS. For example, the UE 500 may be configured to determine priority for DL PRS and/or SRS for positioning over one or more other signals and/or over one or more channels based on the structure of the positioning signal(s). For example, the UE 500 may be configured to limit the amount of PRS processing for a threshold amount of processing of other reference signals, data, and/or control signaling. The UE 500 may be configured to limit PRS processing in accordance with one or more threshold limits, e.g., to help prevent PRS dominating processing potentially to the exclusion of other reference signals, data, and/or control information. For example, if a PRS resource spans 12 symbols within a slot and has a repetition of 32 and has priority over PDSCH/PDCCH/CSI-RS, then for a sequence 32 slots the UE 500 may not be able to process any PDSCH/PDCCH/CSI-RS which may be unacceptable. The UE 500 may, for example, be configured to provide an upper bound to a number of symbols per slot that a PRS resource may contain and have processing priority, e.g., higher priority than PDSCH/PDCCH/CSI-RS. The UE 500 may limit the number of symbols per slot of a PRS resource having processing priority to a threshold quantity of symbols per slot. As another example, the UE 500 may limit a number of repetitions of a PRS resource having processing priority to a threshold quantity of repetitions per instance. As another example, the UE 500 may require a threshold gap (e.g., a threshold of a minimum number of symbols) between consecutive repetitions of a PRS resource that has processing priority, e.g., higher priority than PDSCH/PDCCH/CSI-RS.

As another example, the UE 500 may prioritize processing of PRS in response to the structure permitting reception by the UE 500 of a threshold rate of other signaling (e.g., at least a threshold rate of data signaling and/or signals on one or more channels other than the channel used for PRS).

The prioritization unit 550 may be configured to determine priority of DL PRS processing based on a search window for DL PRS. For example, referring also to FIG. 8, the PRS configuration message 622 may include one or more parameters (e.g., higher layer parameter(s)) defining an expected reception duration 810 of DL PRS and a search window 820 around the expected reception duration 810. The search window 820 is a scheduled time duration that exceeds (is longer than) the expected reception duration 810 of the DL PRS and includes reception time uncertainty. For example, the search window 820 may be defined by a DL-PRS-expectedRSTD-uncertainty parameter and an expectedRSTD parameter. The prioritization unit 550 may be configured to give DL PRS higher processing priority, e.g., over one or more other channels (i.e., not carrying the DL PRS) such as PDSCH with a transmission time 830 overlapping with the expected reception duration 810 and the search window 820. The prioritization unit 550 may be configured to determine whether to give DL PRS higher priority over the entire search window 820 or over a subset of the search window 820 corresponding to the expected reception duration 810 of the DL PRS. Whether the UE 500 will give higher priority to DL PRS over the entire search window 820 or only to the expected reception duration 810 of the DL PRS may be configurable, e.g., changeable based on control information received by the UE 500 via the interface 520 (e.g., received in MAC-CE or DCI signaling).

Figure 9:
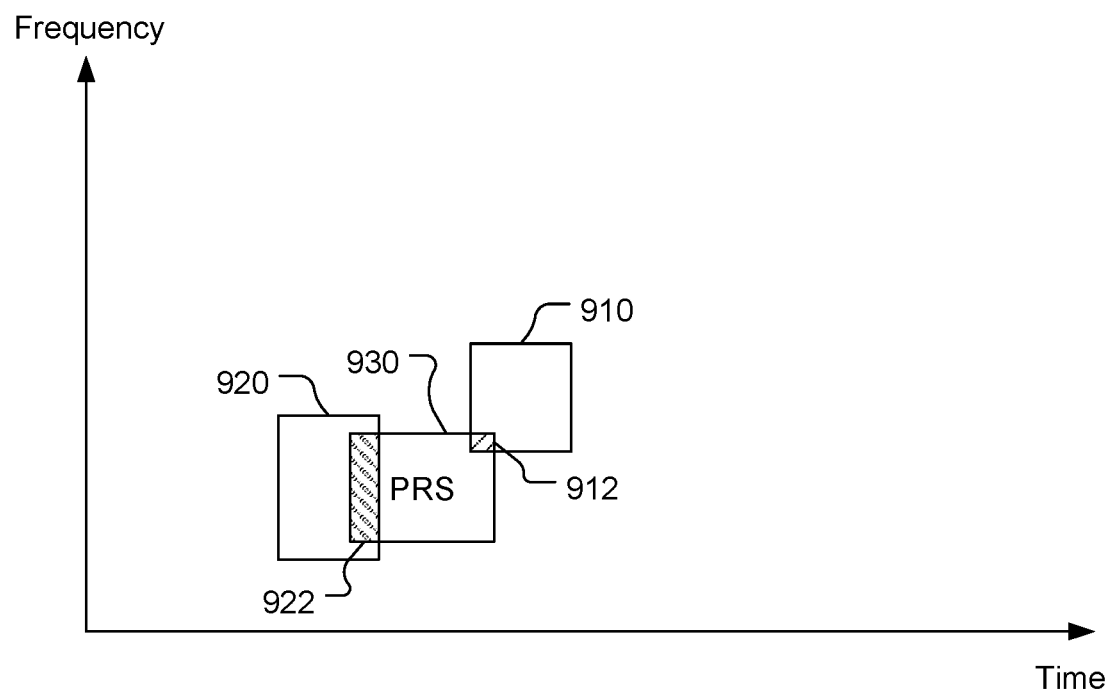
FIG. 9 is a timing diagram of a positioning reference signal, another reference signal, and another signal on another channel.

Referring again to FIG. 6, with further reference to FIGS. 1-5, at stage 640, the UE 500 may process PRS and other information in one or more ways in accordance with the PRS priority determined at stage 630. For example, referring also to FIG. 9, the UE 500 may be configured skip processing of (e.g., discard and/or ignore) all information corresponding to a lower-priority reference signal 910 or all information of a lower-priority channel communication 920 where any portion of such reference signal 910 or such communication 920 collides with higher-priority PRS 930, e.g., a symbol of a higher-priority PRS. For example, the UE 500 may skip processing of any information of an affected slot of a PDSCH communication (i.e., a slot where at least one symbol collides (e.g., is expected to collide or actually collides) with the higher-priority PRS) or any portion of an affected PRS resource or an affected resource set (i.e., a resource or resource set where at least one symbol collides with the higher-priority PRS) of a reference signal such as CSI-RS. Also or alternatively, the UE 500 may be configured not to process (e.g., discard and/or ignore) only a portion 912 of a lower-priority reference signal that collides with the higher-priority PRS 930 or only a portion 922 of a lower-priority channel communication that collides with the higher-priority PRS 930, and to process any non-colliding portion(s) of the lower-priority reference signal or lower-priority channel communication. These alternatives may be applied to combinations of multiple reference signals, multiple channels, or one or more reference signals and one or more channels. If the UE 500 is configured to process non-PRS according to either of these alternatives, then the UE 500 may determine which alternative to implement based on control information received by the UE 500 via the interface 520, e.g., included in MAC-CE or DCI signaling.

Operation

Figure 10:
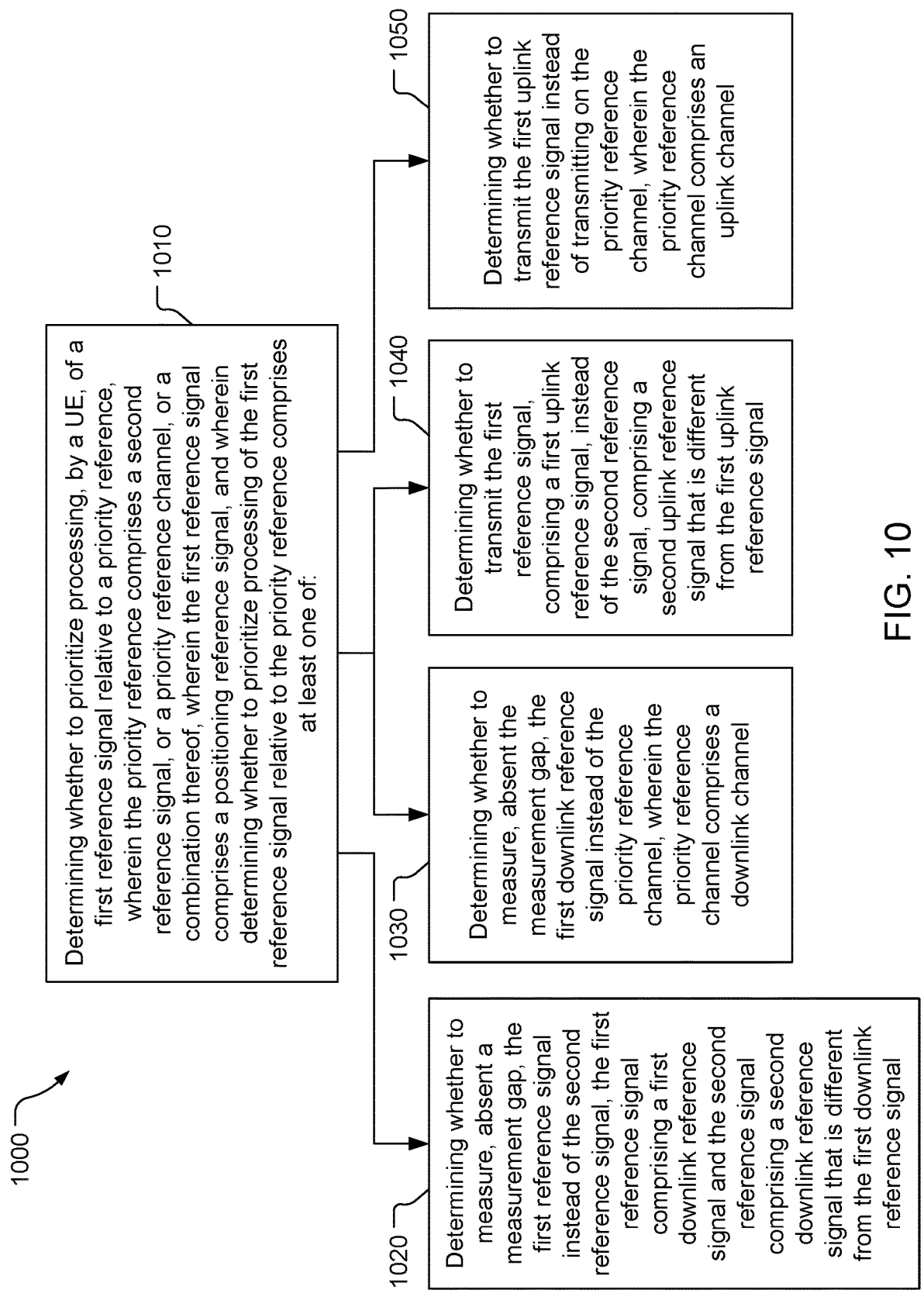
FIG. 10 is a block flow diagram of a positioning reference signal prioritization method.

Referring to FIG. 10, with further reference to FIGS. 1-9, a positioning reference signal prioritization method 1000 includes the stages shown. The method 1000 is, however, an example only and not limiting. The method 1000 may be altered, e.g., by having stages added, removed, rearranged, combined, performed concurrently, and/or having single stages split into multiple stages.

At stage 1010, the method 1000 includes determining whether to prioritize processing, by a UE, of a first reference signal relative to a priority reference, wherein the priority reference comprises a second reference signal, or a priority reference channel, or a combination thereof, wherein the first reference signal comprises a positioning reference signal. For example, the UE 500 may be configured to determine whether to give higher processing priority to a DL PRS signal and/or an SRS for positioning signal, relative to another reference signal and/or relative to a channel, e.g., by performing at least one of stages 1020, 1030, 1040, or 1050. That is, the processor 510 may be configured to perform stage 1020, or to perform stage 1030, or to perform stage 1040, or to perform stage 1050, or any combination thereof (e.g., configured to perform stage 1020 and configured to perform stage 1040, or configured to perform stage 1030 and configured to perform stage 1040 and configured to perform stage 1050, etc.). The processor 510, possibly in conjunction with the memory 530, may comprise means for determining whether to prioritize the first reference signal relative to the priority reference.

At stage 1020, the method 1000 may include determining whether to measure, absent a measurement gap, the first reference signal instead of the second reference signal, the first reference signal comprising a first downlink reference signal and the second reference signal comprising a second downlink reference signal that is different from the first downlink reference signal. For example, the prioritization unit 550 may determine whether to give higher or lower processing priority to a DL PRS signal relative to another DL reference signal (that may or may not be a positioning reference signal) such as a DMRS, PTRS, CIS-RS, or RIM RS. The processor 510, possibly in conjunction with the memory 530, may comprise means for determining whether to measure the first reference signal instead of the second reference signal absent a measurement gap.

At stage 1030, the method 1000 may include determining whether to measure, absent the measurement gap, the first downlink reference signal instead of the priority reference channel, wherein the priority reference channel comprises a downlink channel. For example, the prioritization unit 550 may determine whether to process a DL PRS signal instead of processing signaling (e.g., measuring one or more signals) on a downlink channel such as PDSCH, PDCCH, or PBCH. The priority reference channel is a channel relative to which (with reference to which) processing priority of the first reference signal may be determined, and may convey various types of signals, e.g., reference signals, data signals, etc. The processor 510, possibly in conjunction with the memory 530, may comprise means for determining whether to measure the first downlink reference signal instead of the priority reference channel absent a measurement gap.

At stage 1040, the method 1000 may include determining whether to transmit the first reference signal, comprising a first uplink reference signal, instead of the second reference signal, comprising a second uplink reference signal that is different from the first uplink reference signal. For example, the prioritization unit 550 may determine whether to give higher or lower processing priority to an SRS for positioning relative to another UL reference signal (that may or may not be a positioning reference signal) such as a legacy SRS or SRS for communication. The processor 510, possibly in conjunction with the memory 530, may comprise means for determining whether to transmit the first uplink reference signal instead of the second reference signal.

At stage 1050, the method may include determining whether to transmit the first uplink reference signal instead of transmitting on the priority reference channel, wherein the priority reference channel comprises an uplink channel. For example, the prioritization unit 550 may determine whether to process an SRS for positioning signal instead of processing signaling (e.g., transmitting one or more signals) on an uplink channel such as PUSCH or PUCCH. The processor 510, possibly in conjunction with the memory 530, may comprise means for determining whether to transmit the first uplink reference signal instead of transmitting on the priority reference channel.

Implementations of the method 1000 may include one or more of the following features. In an example implementation, determining whether to prioritize processing of the first reference signal may comprise determining whether to give higher processing priority to the first reference signal than the priority reference based on a timing behavior of the first reference signal. For example, the UE 500 may determine whether to give higher processing priority to the first reference signal based on the first reference signal being aperiodic, or periodic, or semi-persistent. The first reference signal is a PRS, and may be a UL PRS or a DL PRS. The processor 510, possibly in conjunction with the memory 530 and/or the interface 520, may comprise means for determining whether to give higher processing priority to the first reference signal based on a timing behavior of the first reference signal. In another example implementation, the method 1000 comprises giving higher processing priority to the first reference signal than the priority reference in response to the timing behavior of the first reference signal being aperiodic. For example, the UE 500 may give higher processing priority to the first reference signal (e.g., indicate to process, and/or process, the first reference signal instead of or before another reference signal or a (specified) channel) in response to the timing behavior of the first reference signal being aperiodic. In another example implementation, determining whether to prioritize processing of the first reference signal relative to the priority reference may comprise at least one of: responding to the timing behavior of the first reference signal being semi-persistent by determining whether to give processing priority to the first reference signal based on a first control communication received by the UE; or responding to the timing behavior of the first reference signal being periodic by determining whether to give processing priority to the first reference signal based on a second control communication received by the UE. Thus, for example, if the timing behavior of a DL PRS is semi-persistent or periodic, the UE 500 may analyze one or more control signals to determine whether to give higher priority to a DL PRS signal or an SRS for positioning signal. The processor 510, possibly in conjunction with the memory 530, possibly in combination with the interface 520 (e.g., the wireless receiver 244 and the antenna 246), may comprise means for responding to the timing behavior of the first reference signal.

Also or alternatively, implementations of the method 1000 may include one or more of the following features. In an example implementation, determining whether to prioritize processing of the first reference signal relative to the priority reference comprises determining whether to prioritize processing of at least one of a resource of the first reference signal, or a resource set corresponding to the first reference signal, or a frequency layer corresponding to the first reference signal, or any of the first reference signal in response to the first reference signal being sent from a particular network entity. For example, the processor 510, possibly in combination with the memory 530, may determine (and comprise means for determining) whether to prioritize processing of the first reference signal at a resource, resource set, frequency layer, or a network entity (e.g., a TRP) level. In another example implementation, the method 1000 may comprise analyzing an instruction in configuration information scheduling the first reference signal to determine whether to prioritize processing of the first reference signal relative to the priority reference. For example, the UE 500 may analyze the PRS configuration message 622 for one or more explicit or implicit indications of whether to prioritize processing of the first reference signal relative to one or more explicitly or implicitly indicated other reference signals or one or more channels. For example, the UE 500 may analyze one or more indication in the control signal 700 and/or the control signal 750 to determine processing priority. The processor 510, possibly in combination with the memory 530, may comprise means for analyzing the instruction. In another example implementation, the instruction may comprise a plurality of priority instructions corresponding to a plurality of priority references and analyzing the instruction may comprise analyzing each of the plurality of priority instructions to determine whether to prioritize processing of the first reference signal relative to a respective one of the plurality of priority references, with each of the plurality of priority references comprising at least one respective second reference signal that is different than the first reference signal, or at least one respective priority reference channel, or a combination thereof (e.g., another reference signal and a channel). For example, the UE 500 may analyze two or more indications in the control signal 700 and/or the control signal 750 to determine processing priority. The processor 510, possibly in combination with the memory 530, may comprise means for analyzing each of the plurality of priority instructions.

Also or alternatively, implementations of the method 1000 may include one or more of the following features. In an example implementation, determining whether to prioritize processing of the first reference signal relative to the priority reference may comprise determining whether to prioritize processing of the first reference signal relative to the priority reference based on a type of information element of the first reference signal. For example, the UE 500 may analyze the PRS configuration message 622 to determine the information element type (e.g., 3GPP Release 17), and determine from that (e.g., using a look-up table of information element type and prioritization) what priority (higher or lower) to give to the first reference signal and with respect to what other reference signal(s) and/or channel(s). The processor 510, possibly in combination with the memory 530, may comprise means for determining whether to prioritize processing of the first reference signal relative to the priority reference based on a type of information element. In another example implementation, determining whether to prioritize processing of the first reference signal relative to the priority reference may be based on a timing configuration related to a positioning procedure to be implemented, by the UE, corresponding to the first reference signal. For example, the UE 500 may use a presently-selected positioning method, e.g., as explicitly or implicitly selected by the server 400 or as selected by the processor 510, to determine processing prioritization. The server 400 may implicitly select a positioning method by, for example, indicating criteria such a location accuracy and/or timing of location determination and the processor 510 may select a positioning method to meet the indicated criteria. The server 400 may implicitly select a positioning method by, for example, scheduling a particular type of DL PRS and the processor 510 may select a positioning method based on the type of DL PRS. A timing configuration (e.g., periodic, semi-persistent, aperiodic) related to the positioning method may be used by the UE 500 to prioritize processing of the first reference signal relative to the priority reference. The processor 510, possibly in combination with the memory 530, may comprise means for determining whether to prioritize processing of the first reference signal based on a timing configuration related to a positioning procedure to be implemented. In another example implementation, determining whether to prioritize processing of the first reference signal relative to the priority reference may be based on whether the UE has received an instruction to provide a sounding reference signal for positioning. For example, the UE 500 may give higher priority to PRS processing in response to an instruction to provide SRS for positioning having been received (e.g., such that the UE 500 will prioritize PRS processing during times that the UE 500 will provide SRS for positioning). The processor 510, possibly in combination with the memory 530, may comprise means for determining whether to prioritize processing of the first reference signal based on whether the UE has received an instruction to provide an SRS for positioning. In another example implementation, the method 1000 may include prioritizing processing of the first reference signal relative to the priority reference in response to the instruction indicating for the UE to provide the sounding reference signal for positioning with higher priority than a sounding reference signal for communication. For example, the UE 500 may prioritize (e.g., indicate to process, or process) the first reference signal (e.g., an SRS for positioning signal) if the instruction indicates to process SRS for positioning with higher priority than an SRS signal for communication. The processor 510, possibly in combination with the memory 530, may comprise means for prioritizing processing of the first reference signal relative to the priority reference in response to the instruction indicating for the UE to provide the SRS for positioning with higher priority than an SRS for communication.

Also or alternatively, implementations of the method 1000 may include one or more of the following features. For example, determining whether to prioritize processing of the first reference signal relative to the priority reference may be based on a structure of the first reference signal. For example, the UE 500 may determine whether to prioritize the first reference signal based on whether doing so, in view of the structure of the first reference signal, would unacceptably prevent other signals from being processed. The processor 510, possibly in combination with the memory 530, may comprise means for determining whether to prioritize processing of the first reference signal based on the structure of the first reference signal. In another example implementation, the method 1000 may include prioritizing processing of the first reference signal in response to the structure permitting reception by the UE of a threshold rate of other signaling. The threshold rate of other signaling may be, e.g., signaling content of one or more lower-priority signals and/or one or more (lower-priority) channels. The processor 510, possibly in combination with the memory 530, may comprise means for prioritizing processing of the first reference signal. In other example implementations, the method 1000 may include prioritizing processing of the first reference signal relative to the priority reference in response to the structure having less than a threshold quantity of symbols per slot, or having less than a threshold quantity of repetitions per instance, or having at least a threshold gap (e.g., minimum number of symbols) between consecutive repetitions. Thus, for example, the UE 500 may process (e.g., determine a measurement value from, derive a range from, produce and/or send (for SRS for positioning) the first reference signal instead of or before other signaling if the structure of the first reference signal has fewer than a threshold quantity of symbols per slot, or fewer than a threshold quantity of repetitions per instance, or at least a threshold gap between consecutive repetitions.

Also or alternatively, implementations of the method 1000 may include one or more of the following features. In an example implementation, the particular positioning reference signal may be the first downlink positioning reference signal, and the method 1000 may comprise prioritizing processing of the first reference signal relative to the priority reference for a search window spanning a first time duration exceeding a second time duration scheduled for the first reference signal. For example, the UE 500 may prioritize DL PRS for processing for the search window 820 and not just the expected reception duration 810. The processor 510, possibly in combination with the memory 530, may comprise means for prioritizing processing of the first reference signal. In another example implementation, determining whether to prioritize processing of the first reference signal relative to the priority reference for the first time duration may be based on control information received by the UE. For example, the UE may prioritize processing of DL PRS for just the expected reception duration 810 or the search window 820 based on an instruction received by the UE. The processor 510, possibly in combination with the memory 530, may comprise means for determining whether to prioritize processing of the first reference signal.

Also or alternatively, implementations of the method 1000 may include one or more of the following features. In an example implementation, the method 1000 may include reporting, to a network entity, a capability of the UE to prioritize processing of the first reference signal relative to the priority reference. For example, the UE 500 may report whether the UE 500 supports PRS prioritization, and possibly how the UE 500 supports PRS prioritization, e.g., to the server 400 (or another network entity such as the TRP 300) in the UE prioritization capability message 612. The processor 510, possibly in conjunction with the memory 530 and/or the interface 520 (e.g., the wireless transmitter 242 and the antenna 246), may comprise means for reporting the capability of the UE to prioritize processing of the first reference signal relative to the priority reference. In another example implementation, the method 1000 may include prioritizing processing of the first reference signal by skipping processing of any symbol of the second reference signal, or any symbol of a wireless signal corresponding to the priority reference channel, that collides with the particular positioning reference signal and processing any symbol of the second reference signal, or any symbol of the wireless signal corresponding to the priority reference channel, that does not collide with the first reference signal. For example, the processor 510 may discard or ignore any colliding symbol of a lower-priority reference signal or signal of a (lower-priority) channel and process other (non-colliding) symbols of the lower-priority reference signal or signal of the (lower-priority) channel (unless processing is not desired for another reason). The processor 510, possibly in combination with the memory 530, may comprise means for skipping processing, and means for processing, of the second reference signal and/or the wireless signal corresponding to the priority reference channel. In another example implementation, the method 1000 may include: skipping processing of a resource of the second reference signal in response to any portion of the resource of the second reference signal colliding with any portion of the first reference signal; or skipping processing of a resource set of the second reference signal in response to any portion of the resource set of the second reference signal colliding with any portion of the first reference signal; or skipping processing of a particular slot of a wireless signal corresponding to the priority reference channel in response to any symbol of the particular slot of the wireless signal corresponding to the priority reference channel colliding with any portion of the first reference signal. For example, the processor 510 may skip processing (e.g., measuring or transmitting) of any portion of a resource or resource set of another (DL or UL) reference signal if any portion of the resource or resource set collides with a higher-priority positioning reference signal, or may skip processing any part of a slot of a signal corresponding to the priority reference channel where any part of the slot collides with a higher-priority positioning reference signal. The processor 510, possibly in combination with the memory 530, may comprise means for skipping processing of a resource of the second reference signal, means for skipping processing of a resource set of the second reference signal, and/or means for processing of a particular slot of the wireless signal corresponding to the priority reference channel.

Figure 11:
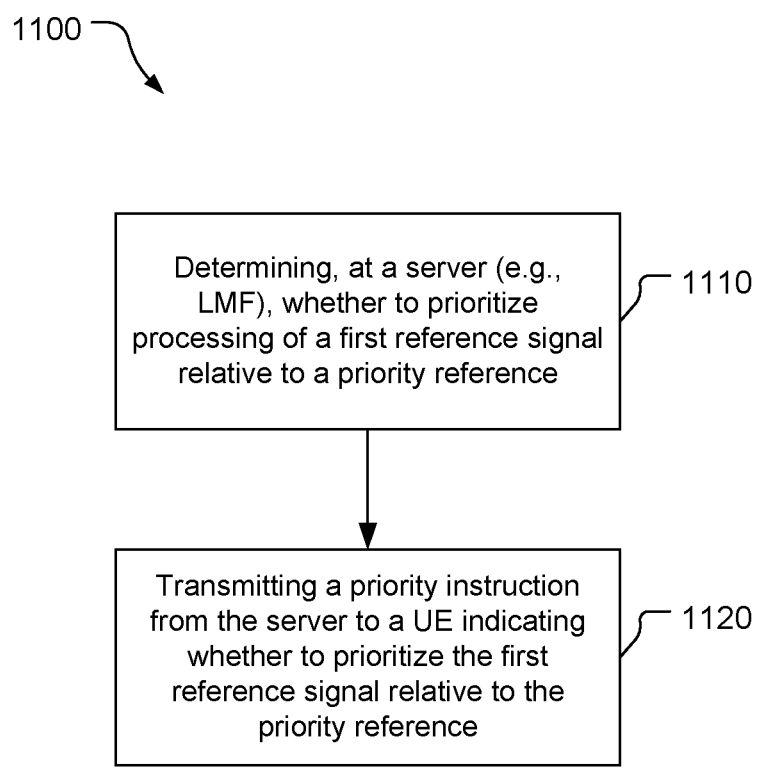
FIG. 11 is a block flow diagram of another positioning reference signal prioritization method.

Referring to FIG. 11, with further reference to FIGS. 1-10, a positioning reference signal prioritization method 1100 includes the stages shown. The method 1100 is, however, an example only and not limiting. The method 1100 may be altered, e.g., by having stages added, removed, rearranged, combined, performed concurrently, and/or having single stages split into multiple stages.

At stage 1110, the method 1100 includes determining, at a server (e.g., an LMF), whether to prioritize processing of a first reference signal relative to a priority reference. For example, the server 400 may determine, e.g., in accordance with the method 1000, whether prioritize processing of a first reference signal relative to a priority reference. As with the method 1000, the first reference signal comprises a PRS and the priority reference comprises a second reference signal and/or a priority reference channel. The priority reference channel may convey reference signals, data signals, communication signals, etc., and thus is not limited to conveying, or required to convey, reference signals. The processor 410, possibly in combination with the memory 411, possibly in combination with the transceiver 415 (e.g., the wireless receiver 444 and the antenna 446, and/or the wired receiver 454) to obtain relevant information, may comprise means for determining whether to prioritize processing of the first reference signal relative to the priority reference (e.g., to determine a processing priority of the first reference signal relative to the priority reference).

At stage 1120, the method 1100 includes transmitting a priority indication from the server to a UE indicating whether to prioritize processing of the first reference signal relative to the priority reference. For example, the processor 410 may transmit one or more messages to the UE 500 via the transceiver (e.g., the wireless transmitter 442 and the antenna 446, and/or the wired transmitter 452) indicating whether to prioritize processing of the first reference signal relative to the priority reference as determined at stage 1110. The priority indication may indicate to prioritize the first reference signal or the priority reference, and may indicate under what condition(s) to do so. The priority indication may indicate different prioritizations corresponding to different conditions (e.g., different timing behaviors, different priority reference channels, different combinations of such conditions, etc.). The processor 410 may transmit one or more messages to the UE 500 via the transceiver (e.g., the wireless transmitter 442 and the antenna 446, and/or the wired transmitter 452) may comprise means for transmitting the priority indication to the UE.

IMPLEMENTATION EXAMPLES

Implementation examples are provided in the following numbered clauses.

1. A user equipment (UE) comprising:
   a transceiver comprising a receiver configured to receive inbound communication signals wirelessly from a network entity and a transmitter configured to transmit outbound communication signals wirelessly to the network entity;
   a memory; and
   a processor communicatively coupled to the memory and the transceiver, the processor being configured to determine whether to prioritize processing of a first reference signal relative to a priority reference, wherein the priority reference comprises a second reference signal, or a priority reference channel, or a combination thereof, wherein the first reference signal comprises a positioning reference signal, and wherein in order to determine whether to prioritize processing of the first reference signal relative to the priority reference the processor is at least one of:
   configured to determine whether to measure, absent a measurement gap, the first reference signal instead of the second reference signal, the first reference signal comprising a first downlink reference signal and the second reference signal comprising a second downlink reference signal that is different from the first downlink reference signal; or
   configured to determine whether to measure, absent the measurement gap, the first downlink reference signal instead of the priority reference channel, wherein the priority reference channel comprises a downlink channel; or
   configured to determine whether to transmit the first reference signal, comprising a first uplink reference signal, instead of the second reference signal, comprising a second uplink reference signal that is different from the first uplink reference signal; or
   configured to determine whether to transmit the first uplink reference signal instead of transmitting on the priority reference channel, wherein the priority reference channel comprises an uplink channel.

2. The UE of clause 1, wherein the processor is configured to determine whether to give higher processing priority to the first reference signal than the priority reference based on a timing behavior of the first reference signal.

3. The UE of clause 2, wherein the processor is configured to give higher processing priority to the first reference signal than the priority reference in response to the timing behavior of the first reference signal being aperiodic.

4. The UE of clause 2, wherein the processor is at least one of:
   configured to respond to the timing behavior of the first reference signal being semi-persistent by determining whether to give processing priority to the first reference signal based on a first control communication received via the transceiver; or
   configured to respond to the timing behavior of the first reference signal being periodic by determining whether to give processing priority to the first reference signal based on a second control communication received via the transceiver.

5. The UE of clause 1, wherein the processor is configured to determine whether to prioritize processing of at least one of a resource of the first reference signal, or a resource set corresponding to the first reference signal, or a frequency layer corresponding to the first reference signal, or any of the first reference signal, in response to the first reference signal being sent from a particular network entity.

6. The UE of clause 1, wherein the processor is configured to analyze an instruction in configuration information scheduling the first reference signal to determine whether to prioritize processing of the first reference signal relative to the priority reference.

7. The UE of clause 6, wherein the instruction comprises a plurality of priority instructions corresponding to a plurality of priority references and the processor is configured to analyze each of the plurality of priority instructions to determine whether to prioritize processing of the first reference signal relative to a respective one of the plurality of priority references, each of the plurality of priority references comprising at least one respective second reference signal that is different than the first reference signal, or at least one respective priority reference channel, or a combination thereof.

8. The UE of clause 1, wherein the processor is configured to determine whether to prioritize processing of the first reference signal relative to the priority reference based on a type of information element of the first reference signal.

9. The UE of clause 1, wherein the processor is configured to determine whether to prioritize processing of the first reference signal relative to the priority reference based on a timing configuration related to a positioning procedure to be implemented by the processor corresponding to the first reference signal.

10. The UE of clause 1, wherein the processor is configured to determine whether to prioritize processing of the first reference signal relative to the priority reference based on whether the processor has received an instruction to provide a sounding reference signal for positioning.

11. The UE of clause 10, wherein the processor is configured to prioritize processing of the first reference signal relative to the priority reference in response to the instruction indicating for the processor to transmit the sounding reference signal for positioning with higher priority than a sounding reference signal for communication.

12. The UE of clause 1, wherein the processor is configured to determine whether to prioritize processing of the first reference signal relative to the priority reference based on a structure of the first reference signal.

13. The UE of clause 12, wherein the processor is configured to prioritize processing of the first reference signal relative to the priority reference in response to the structure permitting reception by the UE of a threshold rate of other signaling.

14. The UE of clause 12, wherein the processor is configured to prioritize processing of the first reference signal relative to the priority reference in response to the structure having fewer than a threshold quantity of symbols per slot.

15. The UE of clause 12, wherein the processor is configured to prioritize processing of the first reference signal relative to the priority reference in response to the structure having fewer than a threshold quantity of repetitions per instance.

16. The UE of clause 12, wherein the processor is configured to prioritize processing of the first reference signal relative to the priority reference in response to the structure having at least a threshold gap between consecutive repetitions.

17. The UE of clause 1, wherein the first reference signal is the first downlink reference signal, and wherein the processor is configured to prioritize processing of the first reference signal relative to the priority reference for a search window spanning a first time duration exceeding a second time duration scheduled for the first reference signal.

18. The UE of clause 17, wherein the processor is configured to determine whether to prioritize processing of the first reference signal relative to the priority reference for the first time duration based on control information received by the transceiver.

19. The UE of clause 1, wherein the processor is configured to report, via the transceiver, a capability of the UE to prioritize processing of the first reference signal relative to the priority reference.

20. The UE of clause 1, wherein to prioritize processing of the first reference signal relative to the priority reference, the processor is configured to skip processing of any symbol of the second reference signal, or any symbol of a wireless signal corresponding to the priority reference channel, that collides with the first reference signal and to process any symbol of the second reference signal, or any symbol of the wireless signal corresponding to the priority reference channel, that does not collide with the first reference signal.

21. The UE of clause 1, wherein to prioritize processing of the first reference signal, the processor is at least one of:
configured to skip processing of a resource of the second reference signal in response to any portion of the resource of the second reference signal colliding with any portion of the first reference signal; or
configured to skip processing of a resource set of the second reference signal in response to any portion of the resource set of the second reference signal colliding with any portion of the first reference signal; or
configured to skip processing of a particular slot of a wireless signal corresponding to the priority reference channel in response to any symbol of the particular slot of the wireless signal corresponding to the priority reference channel colliding with any portion of the first reference signal.

22. A user equipment (UE) comprising:
a transceiver comprising a receiver configured to receive inbound communication signals wirelessly from a network entity and a transmitter configured to transmit outbound communication signals wirelessly to the network entity;
means for determining whether to prioritize processing of a first reference signal relative to a priority reference, wherein the priority reference comprises a second reference signal, or a priority reference channel, or a combination thereof, wherein the first reference signal comprises a positioning reference signal, and wherein the means for determining whether to prioritize processing of the first reference signal relative to the priority reference comprises at least one of:
means for determining whether to measure, absent a measurement gap, the first reference signal instead of the second reference signal, the first reference signal comprising a first downlink reference signal and the second reference signal comprising a second downlink reference signal that is different from the first downlink reference signal; or
means for determining whether to measure, absent the measurement gap, the first downlink reference signal instead of the priority reference channel, wherein the priority reference channel comprises a downlink channel; or
means for determining whether to transmit the first reference signal, comprising a first uplink reference signal, instead of the second reference signal, comprising a second uplink reference signal that is different from the first uplink reference signal; or
means for determining whether to transmit the first uplink reference signal instead of transmitting on the priority reference channel, wherein the priority reference channel comprises an uplink channel.

23. The UE of clause 22, wherein the UE comprises means for determining whether to give higher processing priority to the first reference signal than the priority reference based on a timing behavior of the first reference signal.

24. The UE of clause 23, wherein the UE comprises means for giving higher processing priority to the first reference signal than the priority reference in response to the timing behavior of the first reference signal being aperiodic.

25. The UE of clause 23, wherein the UE comprises at least one of:
means for responding to the timing behavior of the first reference signal being semi-persistent by determining whether to give processing priority to the first reference signal based on a first control communication received via the transceiver; or
means for responding to the timing behavior of the first reference signal being periodic by determining whether to give processing priority to the first reference signal based on a second control communication received via the transceiver.

26. The UE of clause 22, wherein the UE comprises means for determining whether to prioritize processing of at least one of a resource of the first reference signal, or a resource set corresponding to the first reference signal, or a frequency layer corresponding to the first reference signal, or any of the first reference signal in response to the first reference signal being sent from a particular network entity.

27. The UE of clause 22, wherein the UE comprises means for analyzing an instruction in configuration information scheduling the first reference signal to determine whether to prioritize processing of the first reference signal relative to the priority reference.

28. The UE of clause 27, wherein the instruction comprises a plurality of priority instructions corresponding to a plurality of priority references and the UE comprises means for analyzing each of the plurality of priority instructions to determine whether to prioritize processing of the first reference signal relative to a respective one of the plurality of priority references, each of the plurality of priority references comprising at least one respective second reference signal that is different than the first reference signal, or at least one respective priority reference channel, or a combination thereof.

29. The UE of clause 22, wherein the UE comprises means for determining whether to prioritize processing of the first reference signal relative to the priority reference based on a type of information element of the first reference signal.

30. The UE of clause 22, wherein the UE comprises means for determining whether to prioritize processing of the first reference signal relative to the priority reference based on a timing configuration related to a positioning procedure to be implemented, by positioning means of the UE, corresponding to the first reference signal.

31. The UE of clause 22, wherein the UE comprises means for determining whether to prioritize processing of the first reference signal relative to the priority reference based on whether the UE has received an instruction to provide a sounding reference signal for positioning.

32. The UE of clause 31, wherein the UE comprises means for prioritizing processing of the first reference signal relative to the priority reference in response to the instruction indicating for the UE to transmit the sounding reference signal for positioning with higher priority than a sounding reference signal for communication.

33. The UE of clause 22, wherein the UE comprises means for determining whether to prioritize processing of the first reference signal relative to the priority reference based on a structure of the first reference signal.

34. The UE of clause 33, wherein the UE comprises means for prioritizing processing of the first reference signal relative to the priority reference in response to the structure permitting reception by the UE of a threshold rate of other signaling.

35. The UE of clause 33, wherein the UE comprises means for prioritizing processing of the first reference signal relative to the priority reference in response to the structure having fewer than a threshold quantity of symbols per slot.

36. The UE of clause 33, wherein the UE comprises means for prioritizing processing of the first reference signal relative to the priority reference in response to the structure having fewer than a threshold quantity of repetitions per instance.

37. The UE of clause 33, wherein the UE comprises for prioritizing processing of the first reference signal relative to the priority reference in response to the structure having at least a threshold gap between consecutive repetitions.

38. The UE of clause 22, wherein the first reference signal is the first downlink reference signal, and wherein the UE comprises means for prioritizing processing of the first reference signal relative to the priority reference for a search window spanning a first time duration exceeding a second time duration scheduled for the first reference signal.

39. The UE of clause 38, wherein the UE comprises means for determining whether to prioritize processing of the first reference signal relative to the priority reference for the first time duration based on control information received by the transceiver.

40. The UE of clause 22, wherein the UE comprises means for reporting, via the transceiver, a capability of the UE to prioritize processing of the first reference signal relative to the priority reference.

41. The UE of clause 22, wherein the UE comprises means for skipping processing of any symbol of the second reference signal, or any symbol of a wireless signal corresponding to the priority reference channel, that collides with the first reference signal and means for processing any symbol of the second reference signal, or any symbol of the wireless signal corresponding to the priority reference channel, that does not collide with the first reference signal.

42. The UE of clause 22, wherein the UE comprises at least one of:
means for skipping processing of a resource of the second reference signal in response to any portion of the resource of the second reference signal colliding with any portion of the first reference signal; or
means for skipping processing of a resource set of the second reference signal in response to any portion of the resource set of the second reference signal colliding with any portion of the first reference signal; or
means for skipping processing of a particular slot of a wireless signal corresponding to the priority reference channel in response to any symbol of the particular slot of the wireless signal corresponding to the priority reference channel colliding with any portion of the first reference signal.

43. A method comprising:
determining whether to prioritize processing, by a UE (user equipment), of a first reference signal relative to a priority reference, wherein the priority reference comprises a second reference signal, or a priority reference channel, or a combination thereof, wherein the first reference signal comprises a positioning reference signal, and wherein determining whether to prioritize processing of the first reference signal relative to the priority reference comprises at least one of:
determining whether to measure, absent a measurement gap, the first reference signal instead of the second reference signal, the first reference signal comprising a first downlink reference signal and the second reference signal comprising a second downlink reference signal that is different from the first downlink reference signal; or
determining whether to measure, absent the measurement gap, the first downlink reference signal instead of the priority reference channel, wherein the priority reference channel comprises a downlink channel; or
determining whether to transmit the first reference signal, comprising a first uplink reference signal, instead of the second reference signal, comprising a second uplink reference signal that is different from the first uplink reference signal; or
determining whether to transmit the first uplink reference signal instead of transmitting on the priority reference channel, wherein the priority reference channel comprises an uplink channel.

44. The method of clause 43, wherein determining whether to prioritize processing of the first reference signal comprises determining whether to give higher processing priority to the first reference signal than the priority reference based on a timing behavior of the first reference signal.

45. The method of clause 44, wherein the method comprises giving higher processing priority to the first reference signal than the priority reference in response to the timing behavior of the first reference signal being aperiodic.

46. The method of clause 44, wherein determining whether to prioritize processing of the first reference signal relative to the priority reference comprises at least one of:
responding to the timing behavior of the first reference signal being semi-persistent by determining whether to give processing priority to the first reference signal based on a first control communication received by the UE; or
responding to the timing behavior of the first reference signal being periodic by determining whether to give processing priority to the first reference signal based on a second control communication received by the UE.

47. The method of clause 43, wherein determining whether to prioritize processing of the first reference signal relative to the priority reference comprises determining whether to prioritize processing of at least one of a resource of the first reference signal, or a resource set corresponding to the first reference signal, or a frequency layer corresponding to the first reference signal, or any of the first reference signal in response to the first reference signal being sent from a particular network entity.

48. The method of clause 43, wherein the method comprises analyzing an instruction in configuration information scheduling the first reference signal to determine whether to prioritize processing of the first reference signal relative to the priority reference.

49. The method of clause 48, wherein the instruction comprises a plurality of priority instructions corresponding to a plurality of priority references and analyzing the instruction comprises analyzing each of the plurality of priority instructions to determine whether to prioritize processing of the first reference signal relative to a respective one of the plurality of priority references, each of the plurality of priority references comprising at least one respective second reference signal that is different than the first reference signal, or at least one respective priority reference channel, or a combination thereof.

50. The method of clause 43, wherein determining whether to prioritize processing of the first reference signal relative to the priority reference comprises determining whether to prioritize processing of the first reference signal relative to the priority reference based on a type of information element of the first reference signal.

51. The method of clause 43, wherein determining whether to prioritize processing of the first reference signal relative to the priority reference comprises determining whether to prioritize processing of the first reference signal relative to the priority reference based on a timing configuration related to a positioning procedure to be implemented, by the UE, corresponding to the first reference signal.

52. The method of clause 43, wherein determining whether to prioritize processing of the first reference signal relative to the priority reference comprises determining whether to prioritize processing of the first reference signal relative to the priority reference based on whether the UE has received an instruction to provide a sounding reference signal for positioning.

53. The method of clause 52, further comprising prioritizing processing of the first reference signal relative to the priority reference in response to the instruction indicating for the UE to transmit the sounding reference signal for positioning with higher priority than a sounding reference signal for communication.

54. The method of clause 43, wherein determining whether to prioritize processing of the first reference signal relative to the priority reference comprises determining whether to prioritize processing of the first reference signal relative to the priority reference based on a structure of the first reference signal.

55. The method of clause 54, further comprising prioritizing processing of the first reference signal relative to the priority reference in response to the structure permitting reception by the UE of a threshold rate of other signaling.

56. The method of clause 54, further comprising prioritizing processing of the first reference signal relative to the priority reference in response to the structure having fewer than a threshold quantity of symbols per slot.

57. The method of clause 54, further comprising prioritizing processing of the first reference signal relative to the priority reference in response to the structure having fewer than a threshold quantity of repetitions per instance.

58. The method of clause 54, further comprising prioritizing processing of the first reference signal relative to the priority reference in response to the structure having at least a threshold gap between consecutive repetitions.

59. The method of clause 43, wherein the first reference signal is the first downlink reference signal, the method further comprising prioritizing processing of the first reference signal relative to the priority reference for a search window spanning a first time duration exceeding a second time duration scheduled for the first reference signal.

60. The method of clause 59, wherein determining whether to prioritize processing of the first reference signal relative to the priority reference comprises determining whether to prioritize processing of the first reference signal relative to the priority reference for the first time duration based on control information received by the UE.

61. The method of clause 43, further comprising reporting, to a network entity, a capability of the UE to prioritize processing of the first reference signal relative to the priority reference.

62. The method of clause 43, further comprising prioritizing processing of the first reference signal relative to the priority reference by skipping processing of any symbol of the second reference signal, or any symbol of a wireless signal corresponding to the priority reference channel, that collides with the first reference signal and processing any symbol of the second reference signal, or any symbol of the wireless signal corresponding to the priority reference channel, that does not collide with the first reference signal.

63. The method of clause 43, further comprising:
skipping processing of a resource of the second reference signal in response to any portion of the resource of the second reference signal colliding with any portion of the first reference signal; or skipping processing of a resource set of the second reference signal in response to any portion of the resource set of the second reference signal colliding with any portion of the first reference signal; or avoiding processing of a particular slot of a wireless signal corresponding to the priority reference channel in response to any symbol of the particular slot of the wireless signal corresponding to the priority reference channel colliding with any portion of the first reference signal.

64. A non-transitory, processor-readable storage medium comprising processor-readable instructions to cause a processor of a user equipment (UE) to:

determine whether to prioritize processing of a first reference signal relative to a priority reference, wherein the priority reference comprises a second reference signal, or a priority reference channel, or a combination thereof, wherein the first reference signal comprises a positioning reference signal, and wherein to determine whether to prioritize processing of the first reference signal relative to the priority reference the processor-readable instructions comprise at least one of:

processor-readable instructions to cause the processor to determine whether to measure, absent a measurement gap, the first reference signal instead of the second reference signal, the first reference signal comprising a first downlink reference signal and the second reference signal comprising a second downlink reference signal that is different from the first downlink reference signal; or processor-readable instructions to cause the processor to determine whether to measure, absent the measurement gap, the first downlink reference signal instead of the priority reference channel, wherein the priority reference channel comprises a downlink channel; or processor-readable instructions to cause the processor to determine whether to transmit the first reference signal, comprising a first uplink reference signal, instead of the second reference signal, comprising a second uplink reference signal that is different from the first uplink reference signal; or processor-readable instructions to cause the processor to determine whether to transmit the first uplink reference signal instead of transmitting on the priority reference channel, wherein the priority reference channel comprises an uplink channel.

65. The storage medium of clause 64, wherein to determine whether to prioritize processing of the first reference signal the processor-readable instructions comprise processor-readable instructions to cause the processor to determine whether to give higher processing priority to the first reference signal than the priority reference based on a timing behavior of the first reference signal.

66. The storage medium of clause 65, wherein the storage medium comprises processor-readable instructions to cause the processor to give higher processing priority to the first reference signal than the priority reference in response to the timing behavior of the first reference signal being aperiodic.

67. The storage medium of clause 65, wherein to determine whether to prioritize processing of the first reference signal relative to the priority reference the processor-readable instructions comprise at least one of:

processor-readable instructions to cause the processor to respond to the timing behavior of the first reference signal being semi-persistent by determining whether to give processing priority to the first reference signal based on a first control communication received by the UE; or processor-readable instructions to cause the processor to respond to the timing behavior of the first reference signal being periodic by determining whether to give processing priority to the first reference signal based on a second control communication received by the UE.

68. The storage medium of clause 64, wherein to determine whether to prioritize processing of the first reference signal relative to the priority reference the processor-readable instructions comprise processor-readable instructions to cause the processor to determine whether to prioritize processing of at least one of a resource of the first reference signal, or a resource set corresponding to the first reference signal, or a frequency layer corresponding to the first reference signal, or any of the first reference signal in response to the first reference signal being sent from a particular network entity.

69. The storage medium of clause 64, wherein the storage medium comprises processor-readable instructions to cause the processor to analyze a priority instruction in configuration information scheduling the first reference signal to determine whether to prioritize processing of the first reference signal relative to the priority reference.

70. The storage medium of clause 69, wherein the priority instruction comprises a plurality of priority instructions corresponding to a plurality of priority references and the processor-readable instructions to cause the processor to analyze the priority instruction comprise processor-readable instructions to cause the processor to analyze each of the plurality of priority instructions to determine whether to prioritize processing of the first reference signal relative to a respective one of the plurality of priority references, each of the plurality of priority references comprising at least one respective second reference signal that is different than the first reference signal, or at least one respective priority reference channel, or a combination thereof.

71. The storage medium of clause 64, wherein to determine whether to prioritize processing of the first reference signal relative to the priority reference the processor-readable instructions comprise processor-readable instructions to cause the processor to determine whether to prioritize processing of the first reference signal relative to the priority reference based on a type of information element of the first reference signal.

72. The storage medium of clause 64, wherein to determine whether to prioritize processing of the first reference signal relative to the priority reference the processor-readable instructions comprise processor-readable instructions to cause the processor to determine whether to prioritize processing of the first reference signal relative to the priority reference based on a timing configuration related to a positioning procedure to be implemented, by the UE, corresponding to the first reference signal.

73. The storage medium of clause 64, wherein to determine whether to prioritize processing of the first reference signal relative to the priority reference the processor-readable instructions comprise processor-readable instructions to cause the processor to determine whether to prioritize processing of the first reference signal relative to the priority reference based on whether the UE has received a positioning instruction to provide a sounding reference signal for positioning.

74. The storage medium of clause 73, wherein the storage medium comprises processor-readable instructions to cause the processor to prioritize processing of the first reference signal relative to the priority reference in response to the positioning instruction indicating for the UE to transmit the sounding reference signal for positioning with higher priority than a sounding reference signal for communication.

75. The storage medium of clause 64, wherein to determine whether to prioritize processing of the first reference signal relative to the priority reference the processor-readable instructions comprise processor-readable instructions to cause the processor to determine whether to prioritize processing of the first reference signal relative to the priority reference based on a structure of the first reference signal.

76. The storage medium of clause 75, wherein the storage medium comprises processor-readable instructions to cause the processor to prioritize processing of the first reference signal relative to the priority reference in response to the structure permitting reception by the UE of a threshold rate of other signaling.

77. The storage medium of clause 75, wherein the storage medium comprises processor-readable instructions to cause the processor to prioritize processing of the first reference signal relative to the priority reference in response to the structure having fewer than a threshold quantity of symbols per slot.

78. The storage medium of clause 75, wherein the storage medium comprises processor-readable instructions to cause the processor to prioritize processing of the first reference signal relative to the priority reference in response to the structure having fewer than a threshold quantity of repetitions per instance.

79. The storage medium of clause 75, wherein the storage medium comprises processor-readable instructions to cause the processor to prioritize processing of the first reference signal relative to the priority reference in response to the structure having at least a threshold gap between consecutive repetitions.

80. The storage medium of clause 64, wherein the first reference signal is the first downlink reference signal, and wherein the storage medium comprises processor-readable instructions to cause the processor to prioritize processing of the first reference signal relative to the priority reference for a search window spanning a first time duration exceeding a second time duration scheduled for the first reference signal.

81. The storage medium of clause 80, wherein to determine whether to prioritize processing of the first reference signal relative to the priority reference the processor-readable instructions comprise processor-readable instructions to cause the processor to determine whether to prioritize processing of the particular first signal relative to the priority reference for the first time duration based on control information received by the UE.

82. The storage medium of clause 64, wherein the storage medium comprises processor-readable instructions to cause the processor to report, to a network entity, a capability of the UE to prioritize processing of the first reference signal relative to the priority reference.

83. The storage medium of clause 64, wherein the storage medium comprises processor-readable instructions to cause the processor to prioritize processing of the first reference signal relative to the priority reference by skipping processing of any symbol of the second reference signal, or any symbol of a wireless signal corresponding to the priority reference channel, that collides with the first reference signal and processing any symbol of the second reference signal, or any symbol of the wireless signal corresponding to the priority reference channel, that does not collide with the first reference signal.

84. The storage medium of clause 64, wherein the storage medium comprises at least one of:
processor-readable instructions to cause the processor to skip processing of a resource of the second reference signal in response to any portion of the resource of the second reference signal colliding with any portion of the first reference signal; or
processor-readable instructions to cause the processor to skip processing of a resource set of the second reference signal in response to any portion of the resource set of the second reference signal colliding with any portion of the first reference signal; or
processor-readable instructions to cause the processor to skip processing of a particular slot of a wireless signal corresponding to the priority reference channel in response to any symbol of the particular slot of the wireless signal corresponding to the priority reference channel colliding with any portion of the first reference signal.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
a transceiver comprising a receiver configured to receive inbound communication signals wirelessly from a network entity and a transmitter configured to transmit outbound communication signals wirelessly to the network entity;
a memory; and
a processor communicatively coupled to the memory and the transceiver, the processor being configured to:
determine whether to prioritize processing of a first reference signal relative to a priority reference in a window, wherein the priority reference comprises a second reference signal, or a priority reference channel, or a combination thereof, wherein the first reference signal comprises a positioning reference signal, and wherein in order to determine whether to prioritize processing of the first reference signal relative to the priority reference in the window the processor is at least one of:
  configured to determine whether to measure, outside a measurement gap, the first reference signal instead of the second reference signal based on the first reference signal comprising a first downlink reference signal and the second reference signal comprising a second downlink reference signal that is different from the first downlink reference signal and has a different priority than the first downlink reference signal in the window; or
  configured to determine whether to measure, outside the measurement gap, the first downlink reference signal instead of the priority reference channel based on the priority reference signal comprising a downlink channel having a different priority than the first downlink reference signal in the window; and
  indicate a capability of the UE to prioritize processing of the first reference signal relative to the priority reference in the window.

2. The UE of claim 1, wherein the processor is configured to determine whether to give higher processing priority to the first reference signal than the priority reference based on a timing behavior of the first reference signal.

3. The UE of claim 2, wherein the processor is configured to give higher processing priority to the first reference signal than the priority reference in response to the timing behavior of the first reference signal being aperiodic.

4. The UE of claim 2, wherein the processor is at least one of:
  configured to respond to the timing behavior of the first reference signal being semi-persistent by determining whether to give processing priority to the first reference signal based on a first control communication received via the transceiver; or
  configured to respond to the timing behavior of the first reference signal being periodic by determining whether to give processing priority to the first reference signal based on a second control communication received via the transceiver.

5. The UE of claim 1, wherein the processor is configured to determine whether to prioritize processing of at least one of a resource of the first reference signal, or a resource set corresponding to the first reference signal, or a frequency layer corresponding to the first reference signal, or any of the first reference signal, in response to the first reference signal being sent from a particular network entity.

6. The UE of claim 1, wherein the processor is configured to analyze an instruction in configuration information scheduling the first reference signal to determine whether to prioritize processing of the first reference signal relative to the priority reference.

7. The UE of claim 1, wherein the processor is configured to determine whether to prioritize processing of the first reference signal relative to the priority reference based on a timing configuration related to a positioning procedure to be implemented by the processor corresponding to the first reference signal.

8. The UE of claim 1, wherein the processor is configured to determine whether to prioritize processing of the first reference signal relative to the priority reference based on whether the processor has received an instruction to provide a sounding reference signal for positioning.

9. The UE of claim 1, wherein the processor is configured to determine whether to prioritize processing of the first reference signal relative to the priority reference based on a structure of the first reference signal.

10. The UE of claim 1, wherein to prioritize processing of the first reference signal relative to the priority reference, the processor is configured to skip processing of any symbol of the second reference signal, or any symbol of a wireless signal corresponding to the priority reference channel, that collides with the first reference signal and to process any symbol of the second reference signal, or any symbol of the wireless signal corresponding to the priority reference channel, that does not collide with the first reference signal.

11. The UE of claim 1, wherein to prioritize processing of the first reference signal, the processor is at least one of:
  configured to skip processing of a resource of the second reference signal in response to any portion of the resource of the second reference signal colliding with any portion of the first reference signal; or
  configured to skip processing of a resource set of the second reference signal in response to any portion of the resource set of the second reference signal colliding with any portion of the first reference signal; or
  configured to skip processing of a particular slot of a wireless signal corresponding to the priority reference channel in response to any symbol of the particular slot of the wireless signal corresponding to the priority reference channel colliding with any portion of the first reference signal.

12. A user equipment (UE) comprising:
a transceiver comprising a receiver configured to receive inbound communication signals wirelessly from a network entity and a transmitter configured to transmit outbound communication signals wirelessly to the network entity;
means for determining whether to prioritize processing of a first reference signal relative to a priority reference in a window, wherein the priority reference comprises a second reference signal, or a priority reference channel, or a combination thereof, wherein the first reference signal comprises a positioning reference signal, and wherein the means for determining whether to prioritize processing of the first reference signal relative to the priority reference in the window comprises at least one of:
  means for determining whether to measure, outside a measurement gap, the first reference signal instead of the second reference signal based on the first reference signal comprising a first downlink reference signal and the second reference signal comprising a second downlink reference signal that is different from the first downlink reference signal and has a different priority than the first downlink reference signal in the window; or
  means for determining whether to measure, outside the measurement gap, the first downlink reference signal instead of the priority reference channel based on the priority reference signal comprising a downlink channel having a different priority than the first downlink reference signal in the window; and
means for indicating a capability of the UE to prioritize processing of the first reference signal relative to the priority reference in the window.

13. The UE of claim 12, wherein the UE comprises means for determining whether to give higher processing priority to the first reference signal than the priority reference based on a timing behavior of the first reference signal.

14. The UE of claim 13, wherein the UE comprises means for giving higher processing priority to the first reference signal than the priority reference in response to the timing behavior of the first reference signal being aperiodic.

15. The UE of claim 13, wherein the UE comprises at least one of:
- means for responding to the timing behavior of the first reference signal being semi-persistent by determining whether to give processing priority to the first reference signal based on a first control communication received via the transceiver; or
- means for responding to the timing behavior of the first reference signal being periodic by determining whether to give processing priority to the first reference signal based on a second control communication received via the transceiver.

16. The UE of claim 12, wherein the UE comprises means for determining whether to prioritize processing of at least one of a resource of the first reference signal, or a resource set corresponding to the first reference signal, or a frequency layer corresponding to the first reference signal, or any of the first reference signal in response to the first reference signal being sent from a particular network entity.

17. The UE of claim 12, wherein the UE comprises means for analyzing an instruction in configuration information scheduling the first reference signal to determine whether to prioritize processing of the first reference signal relative to the priority reference.

18. The UE of claim 17, wherein the instruction comprises a plurality of priority instructions corresponding to a plurality of priority references and the UE comprises means for analyzing each of the plurality of priority instructions to determine whether to prioritize processing of the first reference signal relative to a respective one of the plurality of priority references, each of the plurality of priority references comprising at least one respective second reference signal that is different than the first reference signal, or at least one respective priority reference channel, or a combination thereof.

19. The UE of claim 12, wherein the UE comprises means for determining whether to prioritize processing of the first reference signal relative to the priority reference based on a timing configuration related to a positioning procedure to be implemented, by positioning means of the UE, corresponding to the first reference signal.

20. The UE of claim 12, wherein the UE comprises means for determining whether to prioritize processing of the first reference signal relative to the priority reference based on whether the UE has received an instruction to provide a sounding reference signal for positioning.

21. The UE of claim 12, wherein the UE comprises means for determining whether to prioritize processing of the first reference signal relative to the priority reference based on a structure of the first reference signal.

22. The UE of claim 12, wherein the UE comprises means for skipping processing of any symbol of the second reference signal, or any symbol of a wireless signal corresponding to the priority reference channel, that collides with the first reference signal and means for processing any symbol of the second reference signal, or any symbol of the wireless signal corresponding to the priority reference channel, that does not collide with the first reference signal.

23. The UE of claim 12, wherein the UE comprises at least one of:
- means for skipping processing of a resource of the second reference signal in response to any portion of the resource of the second reference signal colliding with any portion of the first reference signal; or
- means for skipping processing of a resource set of the second reference signal in response to any portion of the resource set of the second reference signal colliding with any portion of the first reference signal; or
- means for skipping processing of a particular slot of a wireless signal corresponding to the priority reference channel in response to any symbol of the particular slot of the wireless signal corresponding to the priority reference channel colliding with any portion of the first reference signal.

24. A method comprising:
determining whether to prioritize processing, by a UE (user equipment), of a first reference signal relative to a priority reference in a window, wherein the priority reference comprises a second reference signal, or a priority reference channel, or a combination thereof, wherein the first reference signal comprises a positioning reference signal, and wherein determining whether to prioritize processing of the first reference signal relative to the priority reference in the window comprises at least one of:
- determining whether to measure, outside a measurement gap, the first reference signal instead of the second reference signal based on the first reference signal comprising a first downlink reference signal and the second reference signal comprising a second downlink reference signal that is different from the first downlink reference signal and has a different priority than the first downlink reference signal in the window; or
- determining whether to measure, outside the measurement gap, the first downlink reference signal instead of the priority reference channel based on the priority reference signal comprising a downlink channel having a different priority than the first downlink reference signal in the window; and indicating a capability of the UE to prioritize processing of the first reference signal relative to the priority reference in the window.

25. The method of claim 24, wherein determining whether to prioritize processing of the first reference signal comprises determining whether to give higher processing priority to the first reference signal than the priority reference based on a timing behavior of the first reference signal.

26. The method of claim 24, wherein determining whether to prioritize processing of the first reference signal relative to the priority reference comprises determining whether to prioritize processing of at least one of a resource of the first reference signal, or a resource set corresponding to the first reference signal, or a frequency layer corresponding to the first reference signal, or any of the first reference signal in response to the first reference signal being sent from a particular network entity.

27. The method of claim 24, wherein determining whether to prioritize processing of the first reference signal relative to the priority reference comprises determining whether to prioritize processing of the first reference signal relative to the priority reference based on whether the UE has received an instruction to provide a sounding reference signal for positioning.

28. A non-transitory, processor-readable storage medium comprising processor-readable instructions to cause a processor of a user equipment (UE) to:
determine whether to prioritize processing of a first reference signal relative to a priority reference, wherein the priority reference comprises a second reference signal, or a priority reference channel, or a combination thereof, wherein the first reference signal comprises a positioning reference signal, and wherein to determine whether to prioritize processing of the first reference signal relative to the priority reference the processor-readable instructions comprise at least one of:

processor-readable instructions to cause the processor to determine whether to measure, outside a measurement gap, the first reference signal instead of the second reference signal based on the first reference signal comprising a first downlink reference signal and the second reference signal comprising a second downlink reference signal that is different from the first downlink reference signal and has a different priority than the first downlink reference signal in the window; or processor-readable instructions to cause the processor to determine whether to measure, outside the measurement gap, the first downlink reference signal instead of the priority reference channel based on the priority reference signal comprising a downlink channel having a different priority than the first downlink reference signal in the window; and indicate a capability of the UE to prioritize processing of the first reference signal relative to the priority reference in the window.

29. The storage medium of claim 28, wherein to determine whether to prioritize processing of the first reference signal the processor-readable instructions comprise processor-readable instructions to cause the processor to determine whether to give higher processing priority to the first reference signal than the priority reference based on a timing behavior of the first reference signal.

* * * * *